(12) United States Patent
Chatter et al.

(10) Patent No.: US 8,219,483 B2
(45) Date of Patent: Jul. 10, 2012

(54) SELLER AUTOMATED ENGINE ARCHITECTURE AND METHODOLOGY FOR OPTIMIZED PRICING STRATEGIES OF GOODS AND SERVICES

(76) Inventors: Mukesh Chatter, Concord, MA (US); Rohit Goyal, Cambridge, MA (US); Shiao-bin Soong, Littleton, MA (US)

(*) Notice: Subject to any disclaimer, the term of this patent is extended or adjusted under 35 U.S.C. 154(b) by 0 days.

(21) Appl. No.: 13/149,116

(22) Filed: May 31, 2011

(65) Prior Publication Data

US 2011/0231228 A1 Sep. 22, 2011

Related U.S. Application Data

(60) Continuation of application No. 12/965,288, filed on Dec. 10, 2010, which is a division of application No. 11/880,980, filed on Jul. 25, 2007, now Pat. No. 7,895,116.

(51) Int. Cl.
*G06Q 40/00* (2006.01)
(52) U.S. Cl. ......................................... 705/37
(58) Field of Classification Search .................. 705/37
See application file for complete search history.

(56) References Cited

U.S. PATENT DOCUMENTS

| 7,447,649 | B2* | 11/2008 | Jain et al. ................ 705/27.2 |
| 7,610,219 | B2* | 10/2009 | Sayed ..................... 705/26.2 |
| 7,668,755 | B2* | 2/2010 | Jain et al. ................ 705/26.9 |
| 2002/0198818 | A1* | 12/2002 | Scott et al. ............... 705/37 |
| 2003/0023514 | A1* | 1/2003 | Adler et al. .............. 705/27 |
| 2003/0040975 | A1* | 2/2003 | Baron ..................... 705/26 |
| 2003/0046130 | A1* | 3/2003 | Golightly et al. ........... 705/7 |
| 2005/0273709 | A1* | 12/2005 | Lough et al. ............. 715/517 |
| 2007/0078758 | A1* | 4/2007 | Susskind et al. ........... 705/38 |
| 2007/0208630 | A1* | 9/2007 | Chatter et al. ............ 705/26 |

* cited by examiner

*Primary Examiner* — Lindsay M. Maguire
(74) *Attorney, Agent, or Firm* — Clock Tower Law Group; Erik J. Heels; Michael A. Bartley

(57) ABSTRACT

An improved seller automated engine architecture methodology particularly (though not exclusively) for use in automated real-time iterative reverse auctions and/or price quotations over the Internet and the like for purchase and sale of goods and services, providing a choice of architectural implementations while enabling price optimization on market share-directed considerations, specific sales target-directed implementations, seller utility derivative-following implementations, model optimizer implementations and explorations, mathematical optimization-oriented and rules-based implementations.

16 Claims, 26 Drawing Sheets

(Rules Engine Implementation)

(Piecewise exponential)

Sales Target-Directed Implementation

Sales Target-Directed Implementation

SELLER AUTOMATED ENGINE ARCHITECTURE AND METHODOLOGY FOR OPTIMIZED PRICING STRATEGIES OF GOODS AND SERVICES

CROSS-REFERENCE TO RELATED APPLICATIONS

This application is a continuation of U.S. patent application Ser. No. 12/965,288, filed Dec. 10, 2010, titled "Seller automated engine methodology for optimized pricing strategies in automated real-time iterative reverse auctions over the internet and the like for the purchase and sale of goods and services" in the name of Mukesh Chatter, Rohit Goyal, and Shiao-bin Soong, which is a divisional of U.S. patent application Ser. No. 11/880,980, filed Jul. 25, 2007 now U.S. Pat. No. 7,895,116, titled "Seller automated engine architecture and methodology for optimized pricing strategies in automated real-time iterative reverse auctions over the internet and the like for the purchase and sale of goods and services" in the name of Mukesh Chatter, Rohit Goyal, and Shiao-bin Soong, which is hereby fully incorporated by reference.

FIELD OF INVENTION

The present invention relates broadly to the field of on-line shopping for products and services over the Internet, the term "Internet" being used herein to embrace generically all types of public and/or private communication networks using wireless and/or wired transmission media, and combinations of the above, and also, specifically the satellite world wide web. More particularly, the invention is concerned with electronic transactions with price-comparison features, being more directly concerned with buyer-seller real-time iterative bidding and offering, in close simulation of the mechanisms of real marketplace auctions and further enhancements for the benefit of both buyer and seller interests. The more particular, though not exclusive, field herein embraced involves improvements in the approach described and claimed in our earlier co-pending U.S. patent application Ser. No. 11/367,907, filed Mar. 3, 2006, for Method, System And Apparatus For Automatic Real-Time Iterative Commercial Transactions Over The Internet In A Multiple-Buyer, Multiple-Seller Marketplace, Optimizing Both Buyer And Seller Needs Based Upon The Dynamics Of Market Conditions. This approach is herein referred to as the [ARTIST] Architecture (Automated Real-Time Iterative System For On-Demand Transactions). From still a more specific viewpoint, the invention is particularly concerned with automatically optimizing the seller's pricing strategy in real time and in a dynamic market.

BACKGROUND OF INVENTION

As explained in the above co-pending [ARTIST] U.S. patent application, despite development of Internet web search engines and web crawlers for trying to match buyer requests with seller offers, the prior art had not yet provided, before the invention of that co-pending application, a practical method of automated communication between buyers and sellers that allows for truly free marketplace interaction.

This [ARTIST] approach involves an automated real-time iterative reverse auction system and mechanism consisting basically of a buyer system component (BS), a reverse auctioneer controller component (RAC), and a seller automated engine component (SAEJ)—the present invention being particularly concerned with improvements in the implementation of the SAEJ, and with the said co-pending application describing in detail, the overall architecture of each component, including that of the SAEJ, generally. The present invention, in its thrust toward improved seller automated engines, offers a number of novel implementations of such seller automated engine architectures that can achieve and optimize the seller pricing and goals of the before-mentioned [ARTIST] system of said co-pending application.

In general, in current on-line and off-line marketplaces, it is the buyer's burden physically and manually to decide such questions as what is the best price and what and where and when such is available; who is a trustworthy seller; how to maximize discounts using coupons, promotions, purchasing history etc; how to make multiple sellers compete with one another to get the best price; and how to obtain the benefits of aggregated spending, and volume and historic purchasing power leverage. In addition, in case of multiple goods and services, possibly being shipped to different addresses, there is apparently no existing solution, save the invention of said co-pending [ARTIST] application and the present invention, for automatically finding the best combination of sellers to provide such a best price.

The Challenges and Problems of the Sellers

As for the sellers, the challenges and questions include generally how to access a larger addressable market without spending large sums in advertising, man power and capital expenditure. Important further questions, among others, include how to price, what to price and when to update the price; how automatically to compute an optimal price in real-time in automatic reverse auctions; and how iteratively to bid so as to sell the product at the optimal price.

As described in said co-pending [ARTIST] application, sellers face the challenge of finding an optimal pricing strategy which is particularly unique to their own constraints, while meeting their unique and personal business targets in specified time intervals.

A seller works with a number of interacting variables typically including: revenue target, profit target, market share target and others over specified intervals; inventory status in case of retail; volume discount rates from its own suppliers, promotion events timing and magnitude; inherently inaccurate pricing forecasts derived from historic market data; competitive forces impacting the current market; management of conflicting targets as a function of time; volume discount strategy; and others. These interactive variables, largely interdependent, and at times in conflict, are either assigned by the seller, such as targets, or they assume a wide range of values driven by the dynamics of market conditions. The result is massive variation in the choices to be made as the seller attempts to find an optimum pricing strategy specific to its constraints to meet its assigned targets.

Human factors, moreover, often overlay these variations, further complicating the situation. The desired goals, the understanding of the challenges ahead, and the navigating path decisions have a very wide range of possibilities and corresponding consequences. Risk tolerance of the decision maker at the seller plays an important role in establishing the targets and other value assignments to the variables and is typically subject to his/her own financials, perceived reputation, age, and views on both short and long term economic outlook. Risk tolerance is also a function of the benefits a decision maker may derive from the type of equity structure, ranging from private, or preparing to go public, or public, or in the process of going from public to private. In aggregate, these and other human factors considerably influence seller pricing strategies, ranging from very defensive to highly aggressive and in between.

Some of the choices available to the sellers in different situations and fields are described hereinafter to highlight the complexity of the decision-making process with so many variations resulting from intricate inter-relationships of such variables.

A retailer, for example, will typically work with the above-mentioned type of variables, There are also corresponding variables in service institutions such as banking and the like, which may include, for example, multiple deposit targets, corresponding CD durations, times in which these deposit targets must respectively be met, the maximum payable interest rate, the desired blended interest rate, the desired spread with respect to a benchmark or lending rate, the historic and current interest rates, the types of benchmarks, and so on.

While the retail sales vertical is sometimes used herein as an illustrative example, the concepts of the invention are applicable across a wide range of verticals. Each seller defines its unique targets for revenue, profit, growth, and market share, etc. Some sellers track sales and other variables on a daily basis; some weekly; others, monthly or quarterly and some combination of the above. If a target is missed, some move the difference to the immediate next time slot; others distribute it equally over multiple times slots; and yet, some distribute it unequally across multiple time slots to match the customer buying patterns. Some choose to do nothing at all, and some do not have the luxury to go to the next time slot—for example, in the last quarter of the year. The seller thus has to make very many hopefully correct choices as a function of time for each product or service in its portfolio to derive an optimum price as it races to meet its targets.

Interplay among targets and requisite respective emphasis as a function of time and competitive forces in a given time slot, such as a quarter, is, however, highly dynamic and tricky. In addition to the issues mentioned earlier, it is also influenced by other considerations such as the supplier payment terms, available credit, shipment commitment, and investor pressure. The seller's objective is to discover and implement an optimizer strategy, unique to its own goals, among numerous potential strategies. Some will sacrifice profit in favor of revenue, while others will do exactly the reverse. Then there are some sellers who will sacrifice both in order rapidly to reduce the inventory at the tail end of the useful life, especially that of seasonal products. Others may try to sacrifice some targets for the desired market share. Tight inventory management, indeed, is one of the most critical functions for a large number of retailers, whereas some sellers inventories are largely time insensitive variation; for example, a diamond seller. The continual balancing of these often non-synergistic variables in a timely manner and, in response to an ever-changing market, while still trying to meet the targets, is accordingly one of the most difficult challenges for sellers. Frequently these rapidly changing conditions force a seller to shift relative degrees of emphasis among targets—for example, from profit to revenue, to inventory, to market share and then back to revenue and profit, and then perhaps back to market share, or any combinations thereof—all in the same quarter, and all highly subjective to estimation errors. This often results in highly sub-optimal seller pricing decisions at large variance with the market, and in the inability simultaneously to meet the targets.

The rate of approach to such targets as a function of time, moreover, also differs widely among sellers. Some like to make an all out effort early in the quarter to minimize any risk of missing the quarter. This approach, however, runs the risk of prices rising later in the quarter, thus losing some of the profit. On the other hand, some sellers may like to pace slowly initially and pick up momentum as they get closer to the quarter. As an example, a lumber yard may start slow in April and accelerate as it gets closer to June. Other sellers like to sell at a steady pace, participating in the market price variations throughout the specific duration, and resulting in improved diversification. Sellers who have met their revenue target earlier in the quarter than anticipated, furthermore, may choose to slow down to keep the quarterly revenue smooth and predictable; whereas others may choose to be more aggressive for the rest of the quarter and may even accelerate to substantially enhance the profit while the overheads remain largely the same.

Growth and resulting market share is another major consideration in defining the key seller objectives. Some sellers want to grow at a pace faster than the market in order to gain minimum sufficient volume critical to their survivability, or to be a major player, or because of near-term equity valuation considerations, or combinations thereof. Some players, at minimum, need to grow at the market pace or higher so as not to allow the competitors an edge. Some sellers, moreover, only want to grow at the market pace due to various constraints such as lack of growth capital, supply of raw materials, lack of trained manpower, or the fear of inviting anti-competitive or even anti-trust considerations, while some, in fact, may want to grow below the market. Nonetheless, at any time a seller runs the risk of being ambushed by one of its competitors suddenly executing a steeper discount strategy that adversely impacts the market share. It is thus not sufficient for a seller to have made relevant choices early enough to reach the market share target, since the pertinent competitive data is often only available after the fact; for example, at the end of a quarter. Unfortunately, a negative surprise, while useful, can bring havoc to sellers, especially those in the public markets. At present, however, a reasonably predictable mechanism does not exist to receive continuous market share feedback and correspondingly adapt the sales pace to maintain the desired percentage market share ownership, thus leaving today's sellers trading in public markets, highly exposed to the mercy of hedge fund managers and short sellers.

Pricing, moreover, is part art and part science. Ascertaining the accurate price the market will bear is a very difficult proposition. Some advanced sellers use expensive off-line batch-processing systems to process historic pricing data to try to forecast the optimum price,—an inherently inaccurate prediction with a large margin of error. Some sellers like to use historic data from the same time slot a year previous as a reference point; others use just the preceding time slot (as an example, a previous week); yet others, use both. Sometimes the historic data may be misleading; it may, for example, have snowed in a particular week at the same time a year ago, or there may have been a lesser number of shopping days between, say, Thanksgiving and Christmas, thus creating inadequate comparisons. Yet another important variable distorting the historic data is the advent of asynchronous and potentially non-repetitive promotions from competitors at that time. Some sellers are less impacted by seasonal effects and depend more on supply and demand, such as seller of a "hot" new video game or a much anticipated toy, that may distort the historic data of the past. There is, thus, highly questionable repeatability of historic data, particularly as further distorted by current market conditions, which will significantly increase the standard deviation of pricing forecast models. Generally, however, relative qualitative demand data tends to be more reliable, such as retail sales from Monday to Thursday being less than Friday, Saturday, and Sunday, thus providing an insight into relative arrival rate. Predicting the optimum price in a competitive market at a particular point in time, is therefore at best be an expansive speculation resulting in wide variations and the potential for adverse consequences. This problem is compounded when at times there actually is no historic data, as is the case of a new product, or a major change in the market place that renders the old data largely meaningless.

Another challenge faced by sellers is the decision of when to run a promotion independent of, and at times in anticipation of, competitive promotions. These events are typically planned months in advance. Frequently, a seller is unaware of either timing or intention (e.g. a competitor wanting to drastically reduce inventory), or the intensity of a competitor's promotion, and the seller will therefore find it difficult to respond in a timely manner. Manual tracking of promotions run by hundreds or thousands of sellers, especially on-line, moreover, is a difficult if not impossible task. A seller, furthermore, sometimes may not want to respond to every promotion and may typically respond only to sellers of its own class and geographical proximity; for example, a large department store will generally only respond to another similar store, but not to a small player. After a time lag when sellers learn of such promotions, some wait for a while to see the promotion impact on its own sales. A few may match some aspects of it; while others may try to match it entirely by the inefficient manual altering of on-line prices, while leaving the store prices unchanged. Others may try to adapt their own upcoming promotion to those recently run by competitors. A seller, thus, has very many time-consuming alternatives to choose from, each requiring manual sub-optimal intervention that subjects the seller to the increased risk of being out of step with the optimum price and even from its own targets.

It is common in many verticals that a seller receives higher discounts from its wholesalers in order to meet increasingly higher pre-defined volume targets in a specified duration. Sometimes these discounts are retroactive, providing the seller an additional profit on the items already sold. When a seller is close to meeting such a target, it often needs to accelerate the product sales by running a very short term promotion to reach the target in order to acquire the much larger retroactive profit. Unfortunately, however, most sellers have a difficult time taking advantage of this due to the large number of products involved, each with its unique pre-defined volume targets, and also due to the requisite human intervention required on short notice to make the instantaneous pricing decision, and to provide subsequent supervision until such targets are reached.

The above challenges are not specific to any given vertical; rather, they are prevalent across numerous and varied business verticals. Some different examples of such verticals are, as before mentioned, (1) financial institutions such as banking institutions with their exemplary banking deposits and products and services such as CDs, checking, high yield savings, credit cards and mortgages and home equity loans, and student loans among others; (2) the insurance industry, with its line of various products such as homeowners insurance, renters insurance, auto, life and disability insurance, and other financial areas; and (3) consumer retailing and wholesaling, with its varied categories of products such as electronics, home goods, personal goods; automobiles; office supplies, including products such as stationary, furniture, paper; telecom markets, such as T-1 lines, phone lines; construction products such as lumber and building materials; and pharmaceuticals including prescription and non-prescription medications.

In addition to individual products in verticals, such as illustratively listed above, many businesses offer products from the same and/or multiple verticals, and would like to offer bundled pricing, discounts and promotions to existing/returning customers. An example is a bank offering diverse products such as CDs, credit-cards, residential mortgage loans, commercial loans, and auto-loans, including also wanting to offer bundled products and discounts for such products. As, another example, the bank may desire to determine its CD deposit targets based on its loan commitments, and offer better returns on CDs in order to meet its loan commitments. Achieving such goals automatically without manual intervention, moreover, while maintaining all or most of the above goals, is a big challenge with currently used techniques.

All these countless variations thus present a serious challenge to a seller in trying to formulate an optimum pricing strategy, unique to its own constraints, and yet allowing it to meet its targets. This immensely complex and relatively slow human decision-making process has not, accordingly, heretofore lent itself to automation and its resulting efficiency gains—that is, until the aforementioned [ARTIST] invention and the architectures of the present invention.

A Summary of the [ARTIST] Concept

As before stated, in the [ARTIST] automated real-time iterative reverse auction system, a unique and innovative solution is provided for buyers and sellers, wherein a reverse auction controller (RAC) receives buyer requests and solicits iterative bids from sellers equipped with seller automated engines (SAEJ) that respond to each iterative bid request (as part of an auction) in real-time with the optimal price available from the seller at that instant. The seller automated engine (SAEJ) not only provides the buyer with its best price, but also optimizes the price based on the seller's objectives. The before-mentioned combination of automated real-time iterative bidding, the reverse auction controller and seller automated engines, addresses the challenges faced by sellers as outlined above.

A generic automated seller engine (SAEJ) that enables the addressing of many of these challenges and without manual intervention, is described in said co-pending [ARTIST] application and is also summarized herein; disclosing how automatically to track competitive pricing; how to be agile in responding to changing market conditions; how to set sales targets (using revenue, profit margin, sales volume and other similar metrics); how to manage inventory efficiently; and how optimally to manage product pricing to maximize the likelihood of reaching the sales targets; how to maintain and increase market share in a highly competitive environment; how to create promotions and inject promotions instantaneously, based on currently occurring, real-time, market and internal conditions, to a large and targeted set of customers, based on demographics or other criteria; how to trigger higher sales to achieve a volume-based incentive from suppliers, manufacturers of the product or a part of the product; how dynamically to adjust sales from multiple channels by using current market conditions on each sales channel to trigger pricing changes and promotion events that are specific to channels/markets; how dynamically to adjust pricing of well-performing products to compensate for another unrelated under-performing product, thus being more aggressive on the well-performing product to achieve the overall performance targets set forth by the organization; how dynamically to respond to parties (such as individuals) initiating requests for a seller's products, as well as initiate requests to parties willing to compete for reselling a seller's products (such as wholesalers and resellers); how to maintain and track consumer and reseller desires to purchase products at certain price points determined by them, and offer such prices to a captive market that is willing to purchase at these price points without being forced to advertise such prices to entities outside of the target customers, such as competitors or other customers, and without requiring the customers to register on a seller-specific system such as the seller's web site; and how to achieve all of the above goals simultaneously while changing the priority of each goal based on current market conditions?

As earlier stated, for certain market conditions or time periods in the sales cycle, for example, profit margin may be more important than revenue, while during other sales periods, the reverse may be true. The invention addresses how to achieve all of the above goals simultaneously without manual intervention each time the price has to be adjusted to achieve the goals in the presence of dynamically changing market conditions; also how to achieve all of the above goals simultaneously without waiting for offline tools to gather market data and adjust pricing subject to high estimation errors over the period of a week or month or more; and how to achieve the above goals simultaneously without being required to predict future market conditions—indeed, achieving the above goals simultaneously by changing pricing in real-time.

These functions are now attainable with the generic automated seller engine (SAEJ) described in said co-pending application and without manual intervention; and improved and optimized architectures for implementation of the same are herein later described in the present application; and, more specifically, automation engine implementations, capable, indeed, of discovering optimal pricing strategies in real-time in a dynamic market, and unique to each seller's constraints as it attempts to reach its targets.

The [ARTIST] concept, moreover, provides an effective method of communications-network shopping by buyers of products and services for purchasing such from sellers, wherein buyers request the automatic reverse auctioneer or auction controller (RAC) to initiate a reverse auction in real time amongst willing sellers and to solicit from their automated seller engines (SAEJ) their automatic real-time iterative bidding price quotations for such products and services, to be returned automatically over the network back to the controller under the iterative processing guidance of the controller to assure a best bid price quotation for the buyer; and automatically effecting buyer notification or purchase at such best price, all even while the buyer may remain on-line, and without any manual intervention.

The present invention now further provides such [ARTIST] systems, among others, with automatic seller optimization techniques and with a choice of options for improved automated seller engine architecture implementations depending upon the particular application involved. The architecture has multiple possible implementations that include a parallel processing architecture, or a pipeline architecture, or a hub and spoke model, or also a hybrid combination of the above, as later explained in detail. The core idea is to implement a price management unit that is responsible for receiving requests from the controller (RAC) for one or more items that the buyer expresses interest in buying. It also receives input from the system in the sense that it is apprised of what the market data is; it knows for existing products what the historical prices are; and it is also configured by the seller engine itself that enters the business objectives of the seller user—that is, the specific terms of targets or goals and the constraints that the seller enters into the system. Based on the type and the values of these goals that the seller enters into the system, the price management unit optimizes the price for the business objectives of the seller.

The present invention, as described more fully hereinafter, provides several specific implementations of how automatically to optimize the price, (1) for specific target-directed implementations, (2) for market-share directed implementations, (3) for a hereinafter described utility derivative-following implementation, and (4) for a model optimizer implementation. In addition, the invention provides for novel mathematical optimization-oriented implementation more generally. The price management unit, furthermore, can also use a more conventional rules-based implementation, as also later described.

OBJECTS OF INVENTION

A primary object of the invention, accordingly, is to provide for the introduction and implementation of a novel price management and seller price optimizing system in the [ARTIST] type method and system of said co-pending application, and similar systems, enabling automatic real-time iterative commercial transactions over the Internet in a multiple-buyer, multiple-seller marketplace, while automatically optimizing both buyer and seller needs based upon the dynamics of market conditions and the seller's inputted business objectives, and constraints, as the price management unit receives requests from an auction controller for pricing bids on items that the buyer may request.

A further object is to provide price-optimizing novel seller automated engine architectural implementations for use in such and related systems.

An additional object is to provide a more general automated novel method and engine for price management by select and novel mathematical and physical implementations for optimizing seller price bids under changing market conditions in real time.

Another object is to provide automatic pricing and optimizing features across a wide range of verticals in widely varying businesses ranging from retail products to banking and insurance services, among others.

Other and further objects will be explained and described hereinafter and are more particularly delineated in the appended claims.

SUMMARY OF INVENTION

In summary, however, from one of its important aspects, the invention provides a method of communications-network shopping by buyers of products and services for purchasing such from sellers, wherein buyers request an automatic reverse auctioneer or auction controller (RAC) to initiate a reverse auction in real time amongst willing sellers and to solicit from automated seller engines (SAEJ) of the sellers their automatic real-time iterative bidding price quotations for such products and services, to be returned automatically over the network back to the controller without any manual intervention and under the iterative processing guidance of the controller to assure a best bid price quotation for the buyer;

the method comprising, providing a choice of a plurality of options for automated seller engine architecture implementations depending upon the particular application involved, and selected from the group consisting of a parallel processing architecture, a pipeline architecture, a hub and spoke architecture and a hybrid combination of the above;

implementing price managing that is responsible for receiving requests from the controller (RAC) for one or more items that the buyer expresses interest in buying;

in the light of received market data and historical prices, configuring the seller engine itself to enter the business objectives of that seller in specific terms of targets or goals that the seller enters; and, based on the type and the values of these goals, automatically optimizing at the seller engine the price for realizing the business objectives of the seller.

The methodology underlying the invention can be implemented in a system for conducting real-time commercial transactions between buyers and sellers of products and services through an intermediate reverse auctioneer controller communicating on-line with both buyer and seller over the Internet, and providing on-line buyer requests for seller price quotations, and for thereupon communicating the same over the Internet to sellers;

each seller being equipped with a seller automatic engine storing that seller's specific predetermined business objectives and market condition information and responsive to the buyer requests in order automatically to create and to respond to the controller with a price quotation based upon the buyer request and within the respective guidelines of seller-specific predetermined information stored in that seller's automatic seller engine;

a processor for processing the price quotations received back over the Internet from the seller automatic engines to initiate an iterative real-time automatic seller engine competitive bettering of the price quotations within said respective guidelines, until a best price quotation is received, for thereupon enabling the automatic notifying of, or purchasing by, the buyer at such best price quotation;

the seller automatic engines being adapted to use a choice of architectural price optimizing implementation selected from the group consisting of a parallel processing architecture, a pipeline architecture, a hub and spoke architecture, and a hybrid combination thereof.

The price optimizing techniques of the invention and the mathematical basis therefor are also useable in other than reverse auction applications, and they find particular usefulness in the automatic pricing of services and products and bundling of the same in the banking, insurance and similar service institutions, as later more fully addressed.

Preferred architectures, and best mode-designs, apparatus and embodiments are later described in detail and in connection with the accompanying drawings.

DRAWINGS

In the accompanying drawings, FIG. 1 is an overall high level block system diagram of a generic seller-automated engine implementation architecture referred to by the previously mentioned acronym "SAEJ"; for use preferably and particularly, though not exclusively, in the [ARTIST] type system of said co-pending application;

Figure 12:
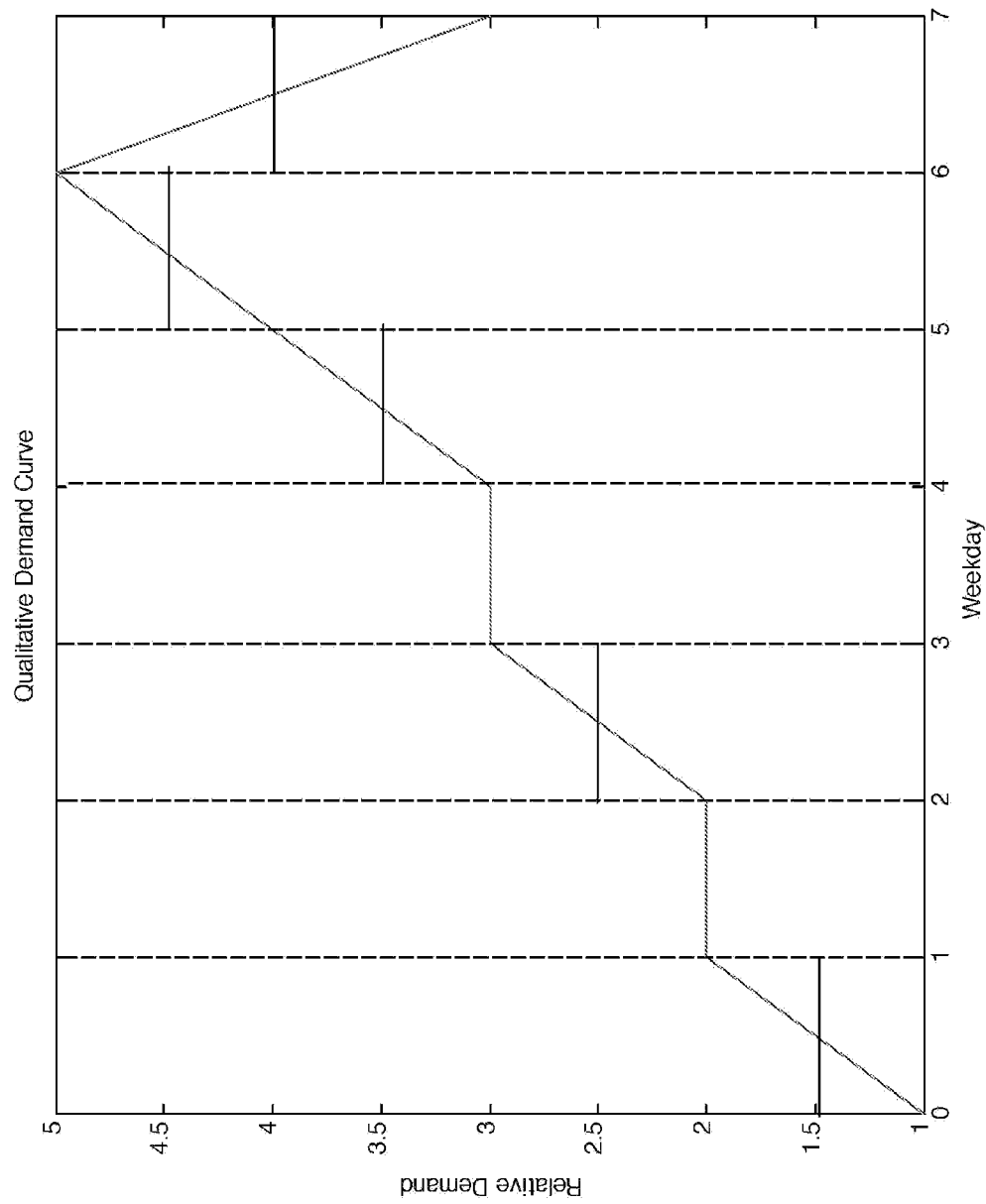
Figure 13:
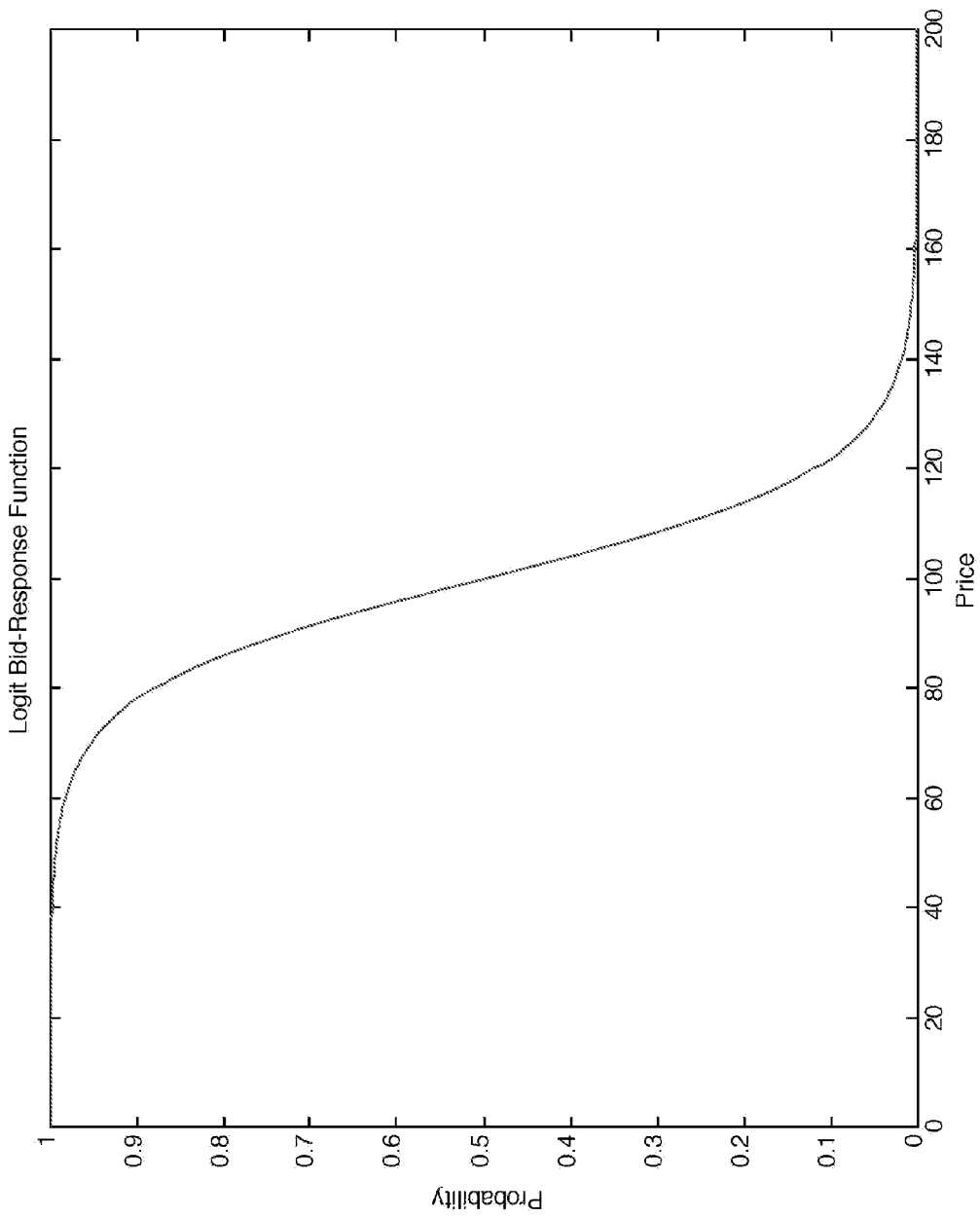
Figure 14:
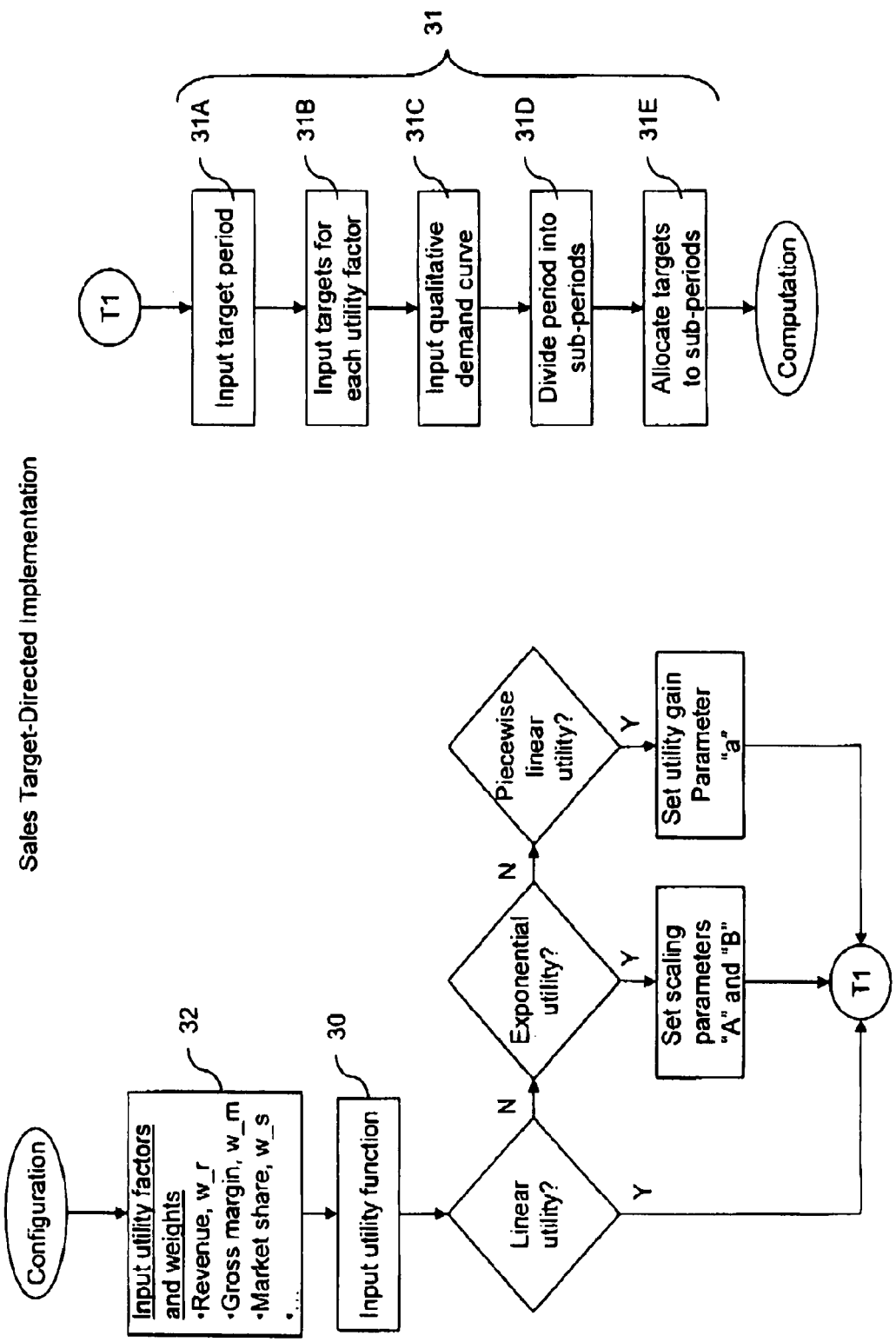
Figure 15:
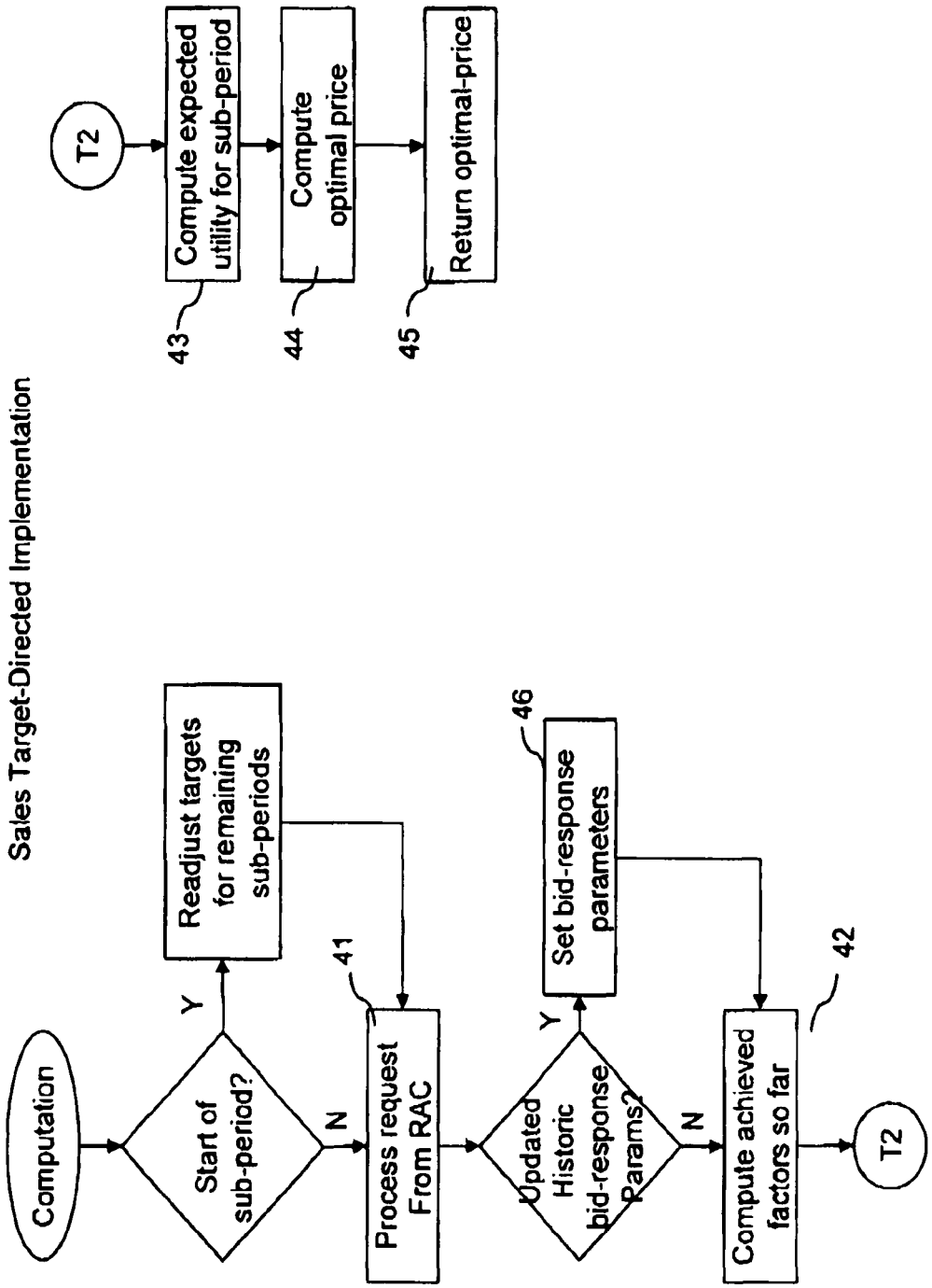
Figure 16:
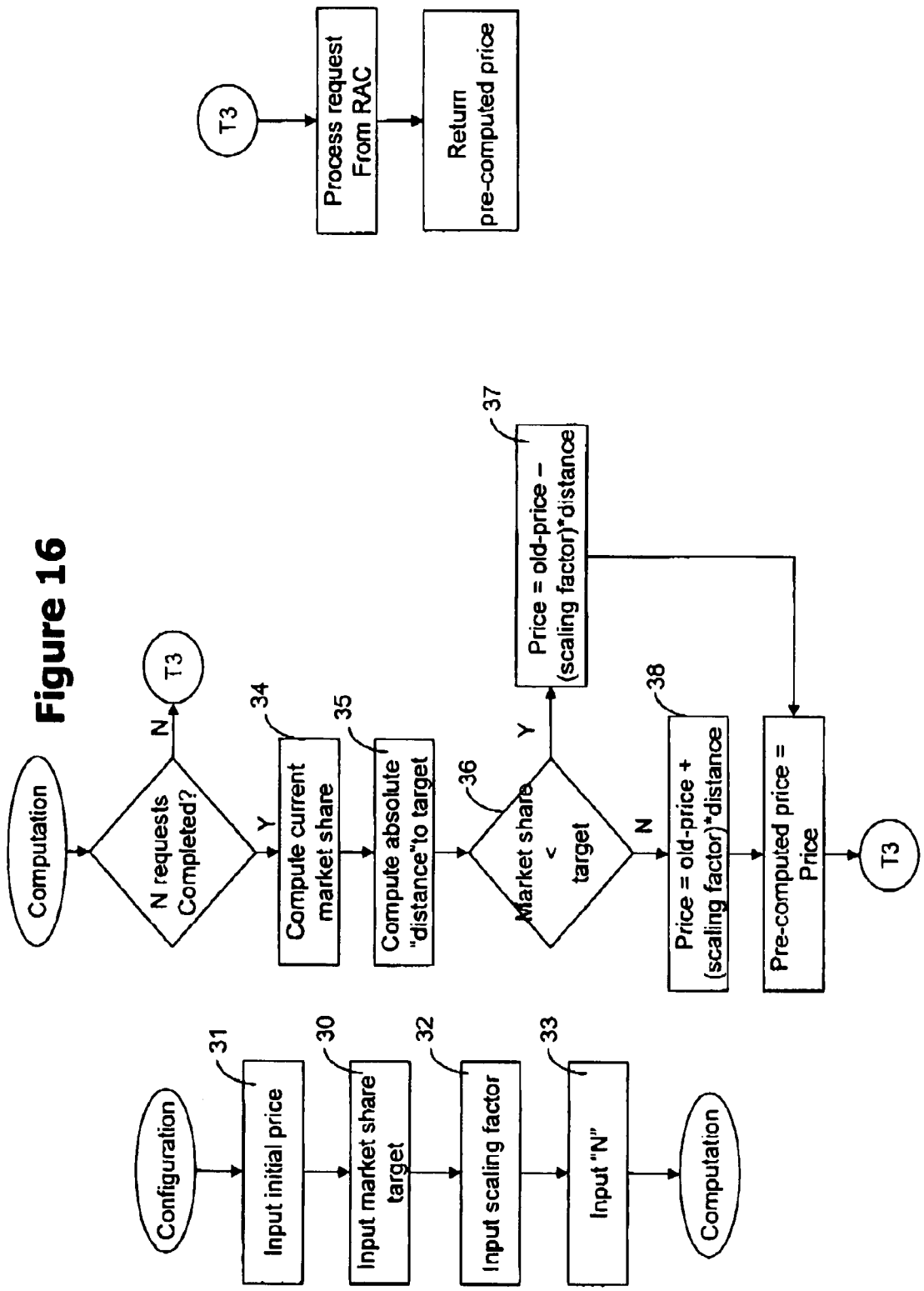
Figure 17:
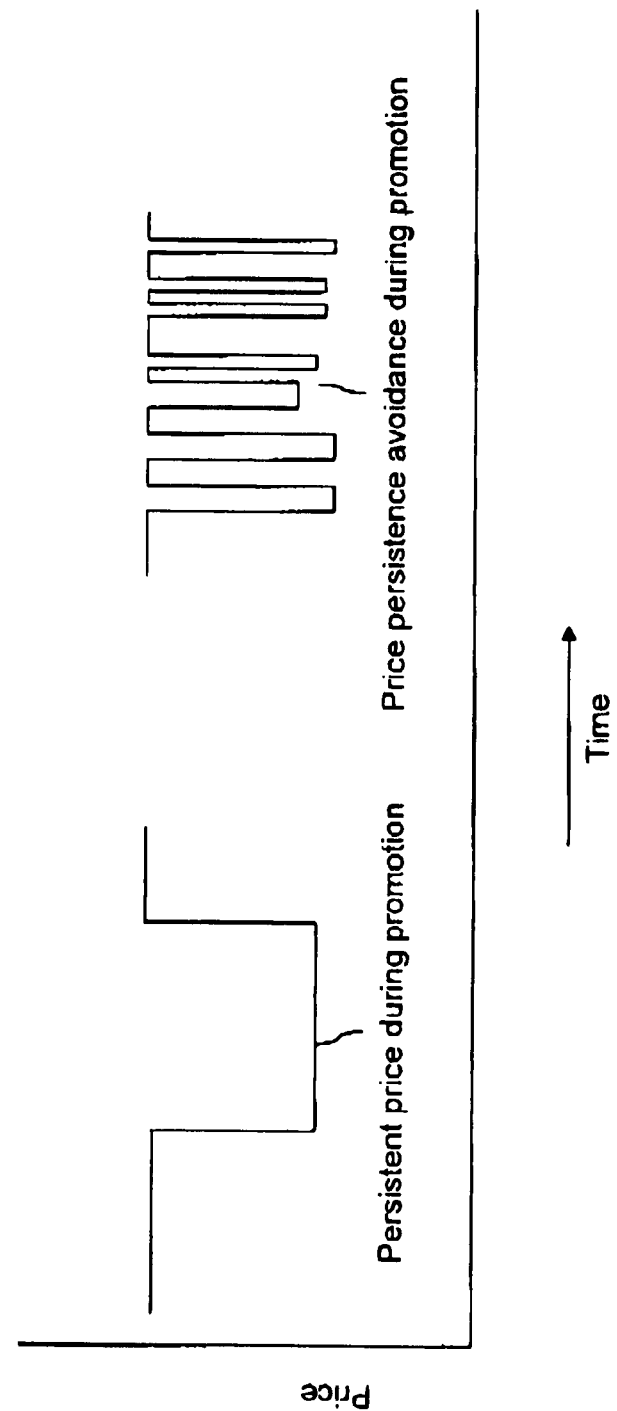
Figure 18:
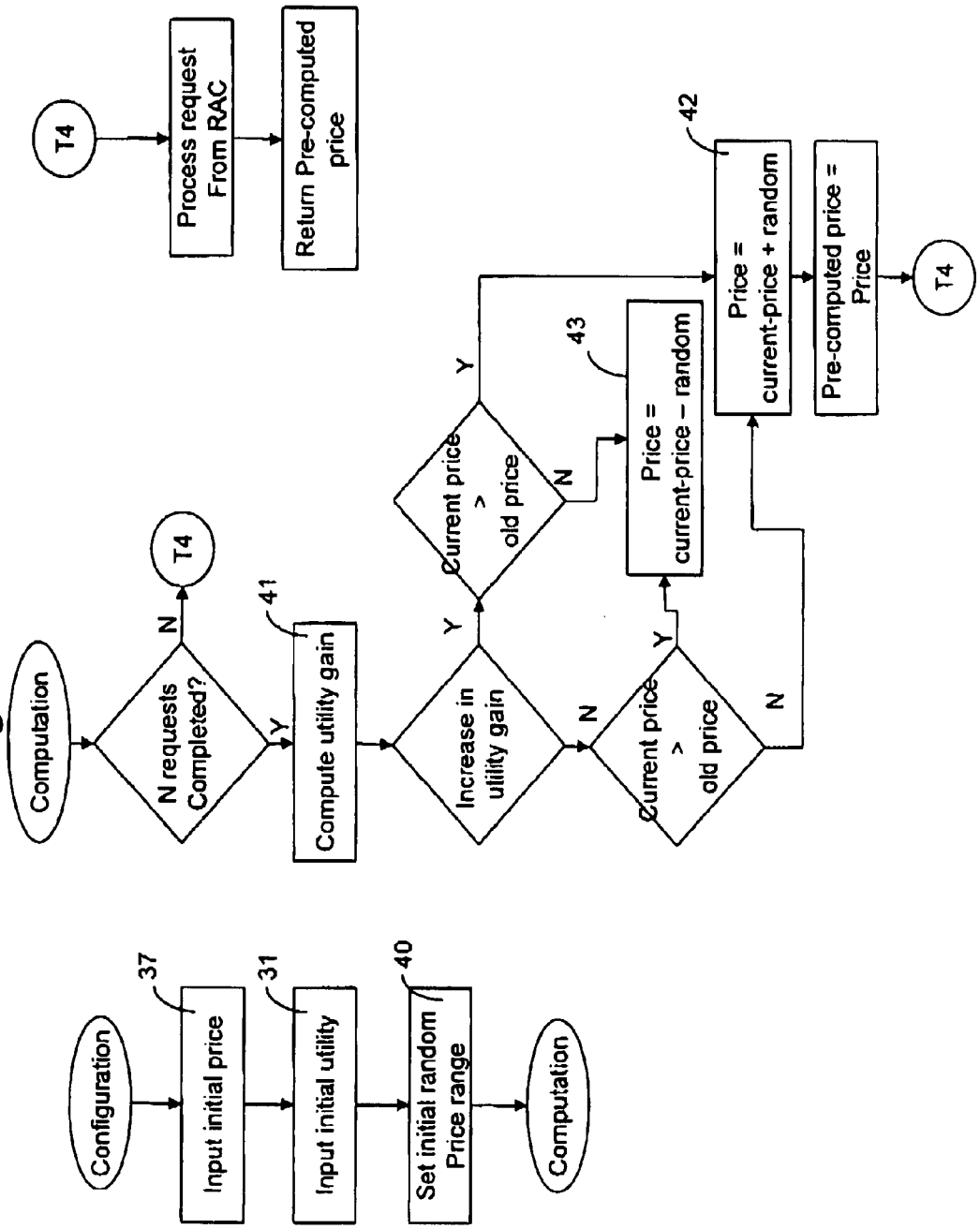
Figure 19:
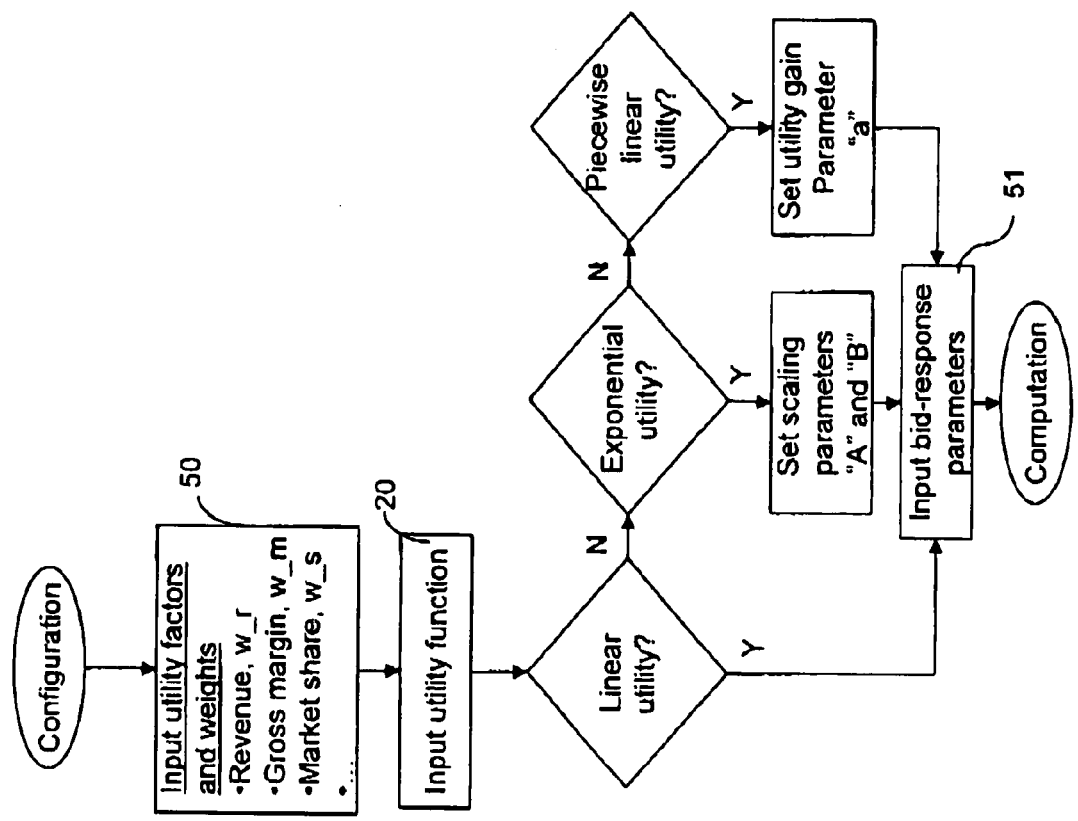
Figure 20:
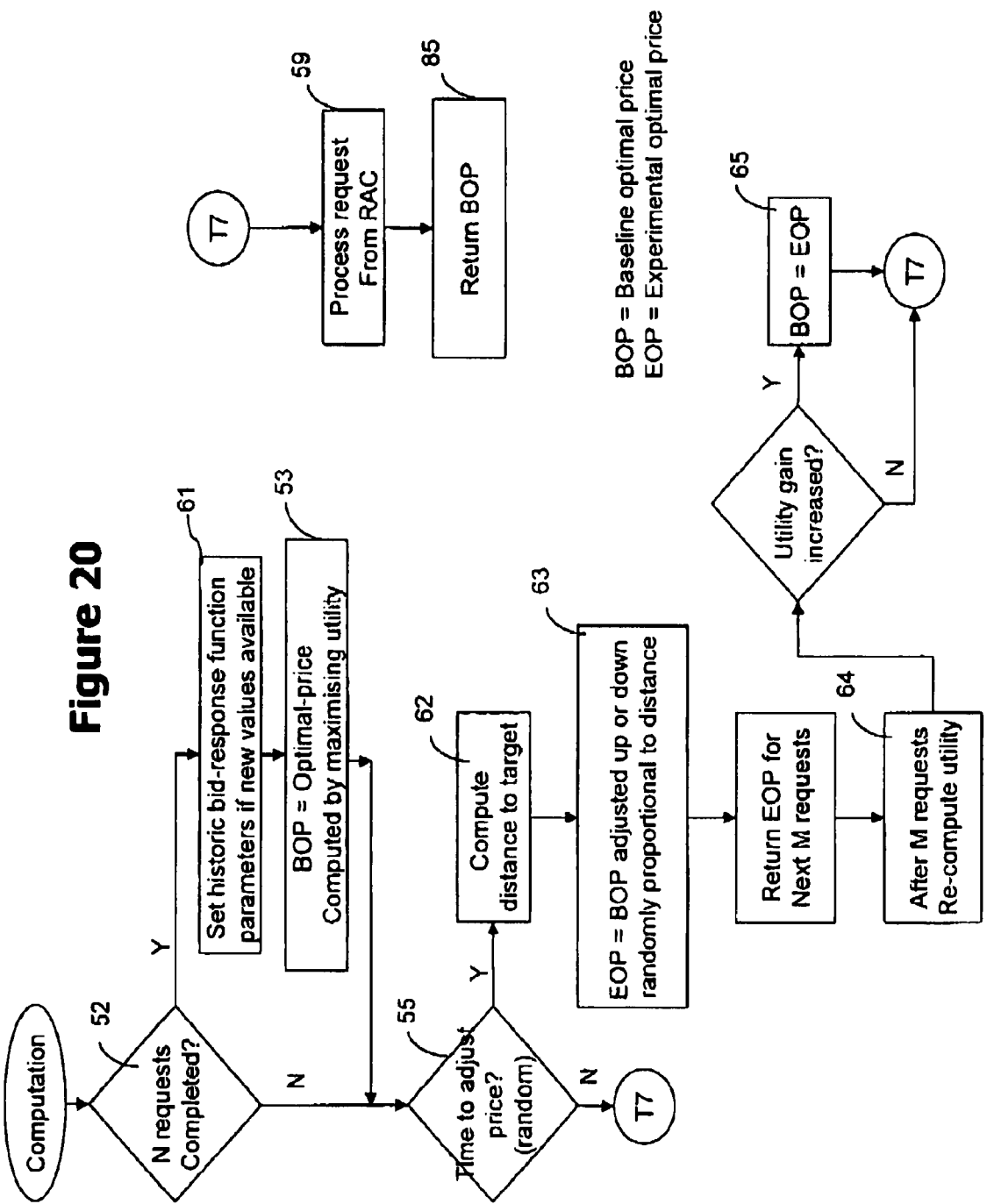
Figure 21:
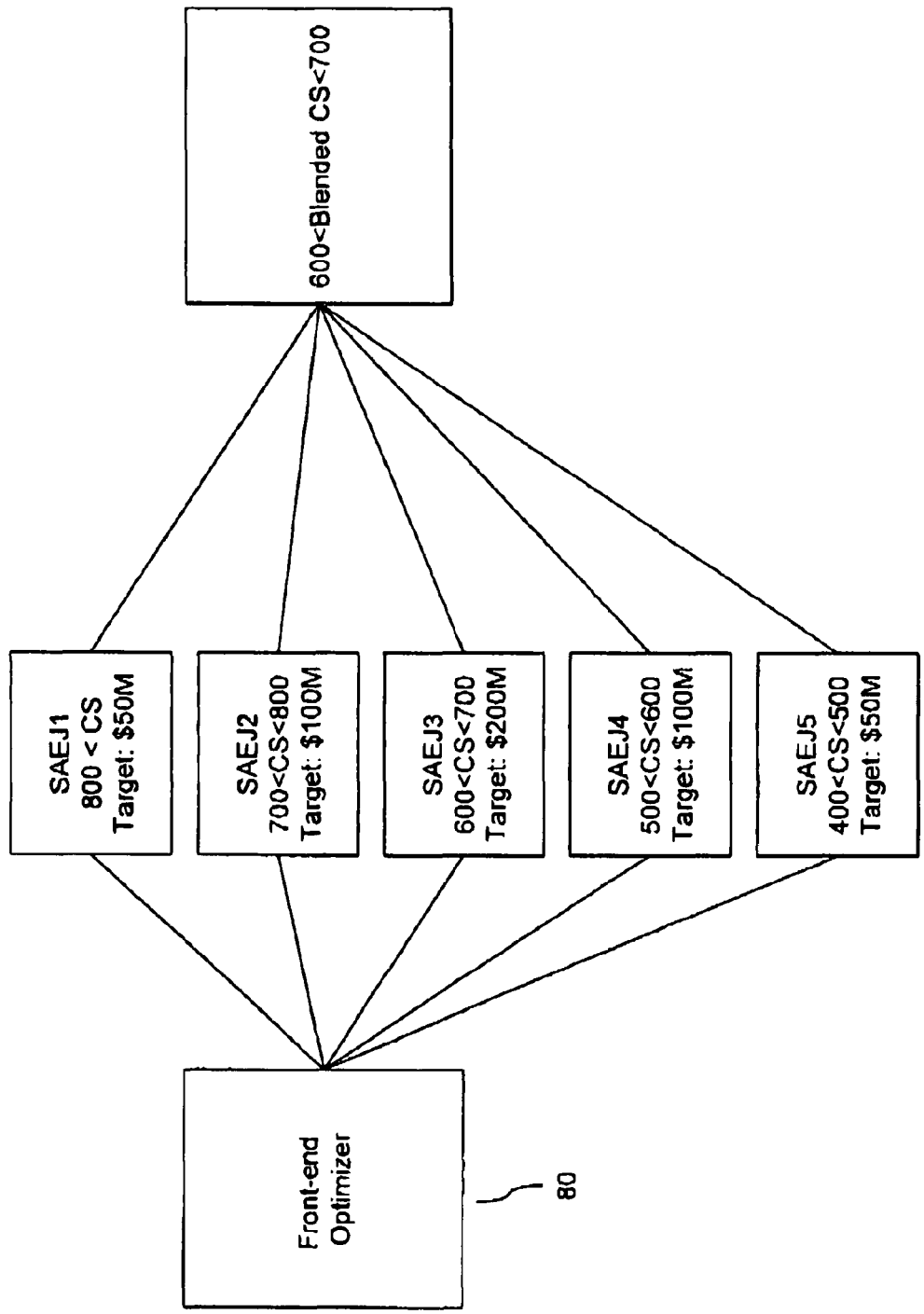
Figure 22:
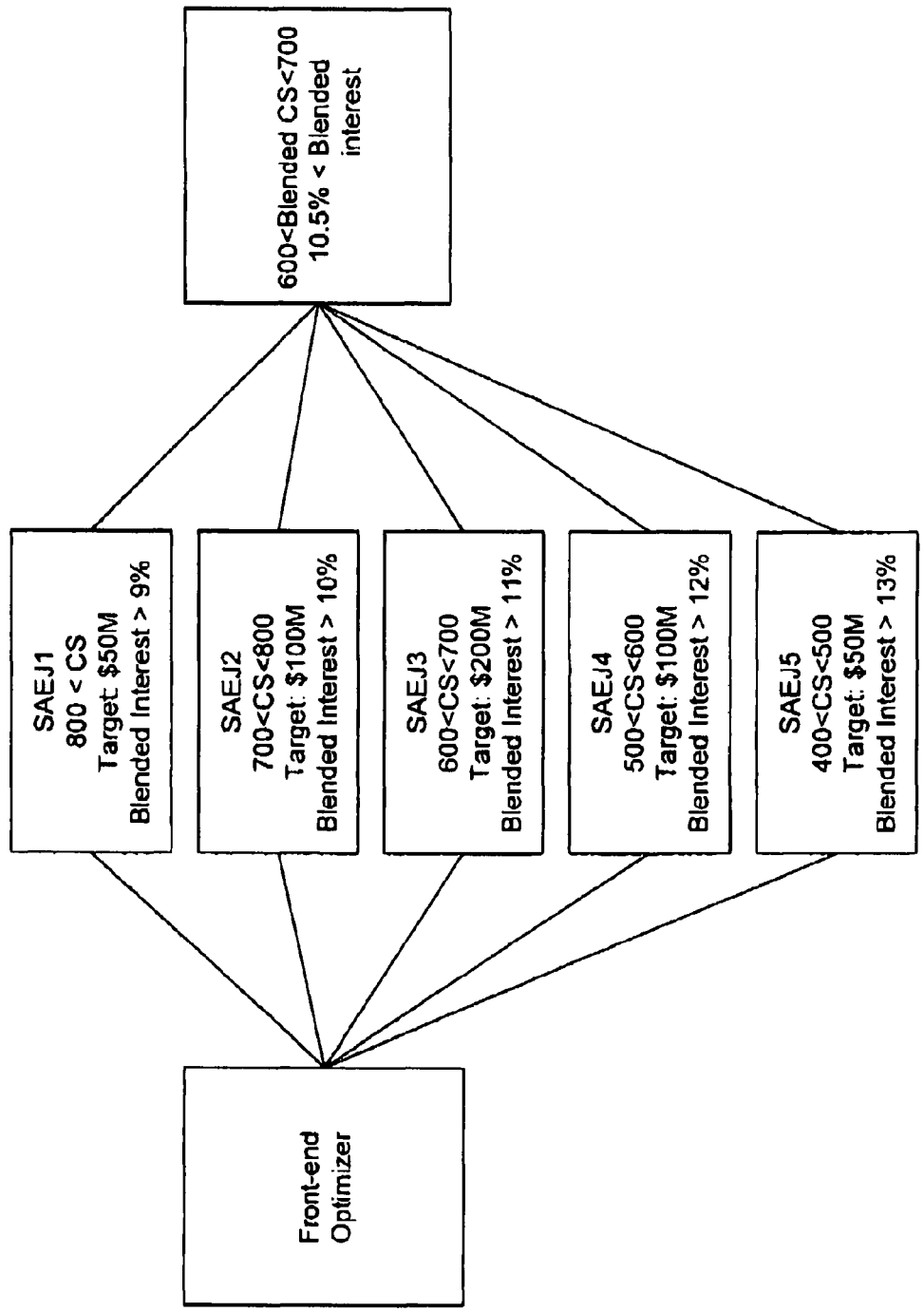
Figure 23:
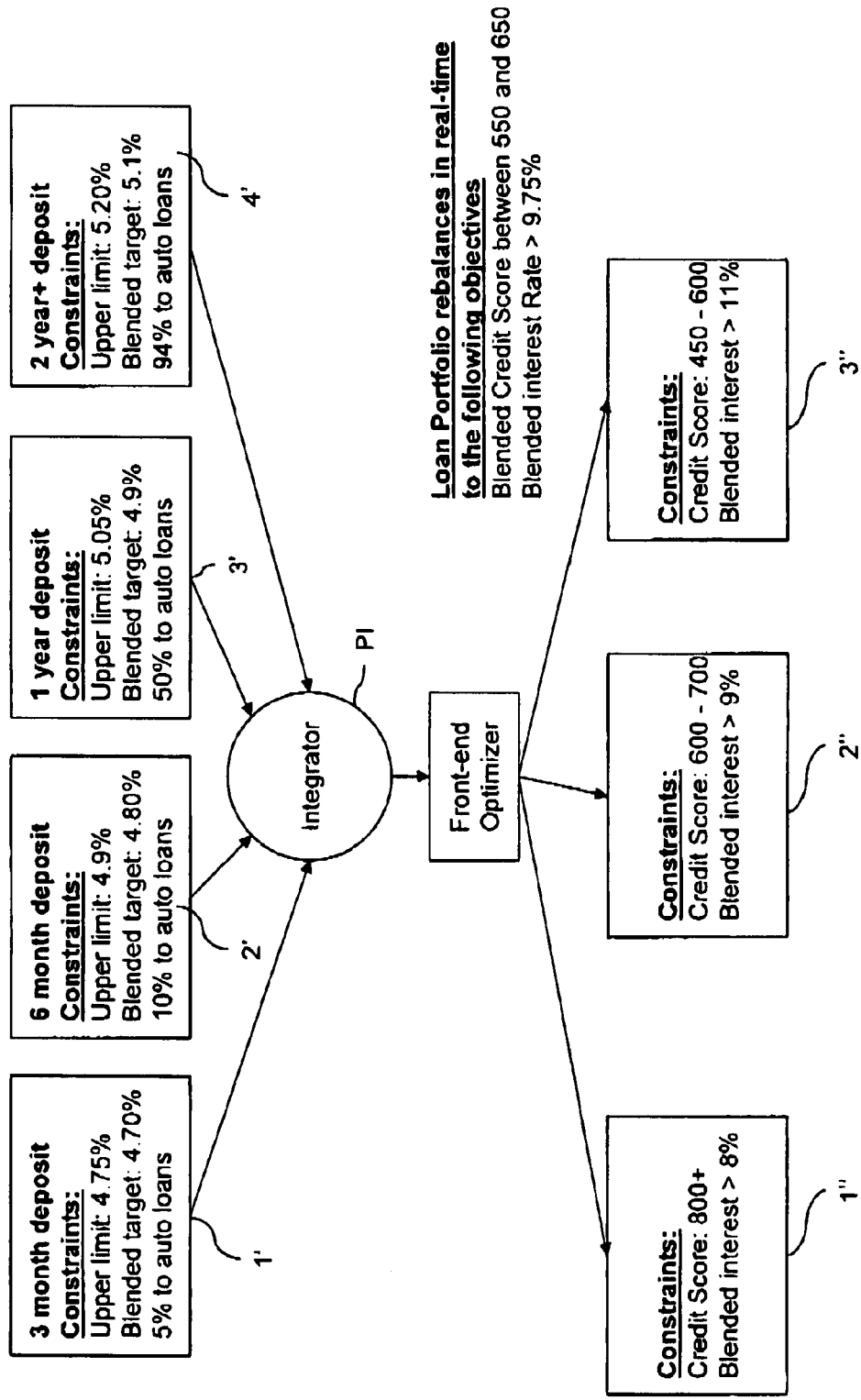

FIGS. 8, 9(a), 9(b), 10(a) and 10(b) are graphs of illustrative utility curves—linear, piecewise linear, and exponential, respectively,—useful with the invention;

FIG. 11(a) presents a piecewise exponential utility curve, and FIG. 11(b), a sample hybrid utility function;

FIG. 12 is an exemplary logit historic-response curve;

FIG. 13 presents an illustrative qualitative demand curve as a function of days of the week;

FIGS. 14 and 15 are block schematic and target-directed implementation diagrams of a configuration for use in the improved SAEJ structures of the invention, illustrating optimal price computation in accordance with the invention;

FIGS. 16 and 18 are diagrams similar to FIG. 14 illustrating, respectively, a market share-directed SAEJ implementation and a utility derivative-following implementation, respectively;

FIG. 17 is a schematic pricing cycle representation of persistent price during promotion and avoidance of such persistent price auction;

FIGS. 19 and 20 show suitable model optimizer configurations with exploration implementations, respectively configured and computational; and FIGS. 21 through 23 are block diagrams of adaptation of the optimizing engine technique of the invention to illustrative banking credit card and loan industry offerings.

DESCRIPTION OF PREFERRED EMBODIMENT(S) OF THE INVENTION

Figure 1:
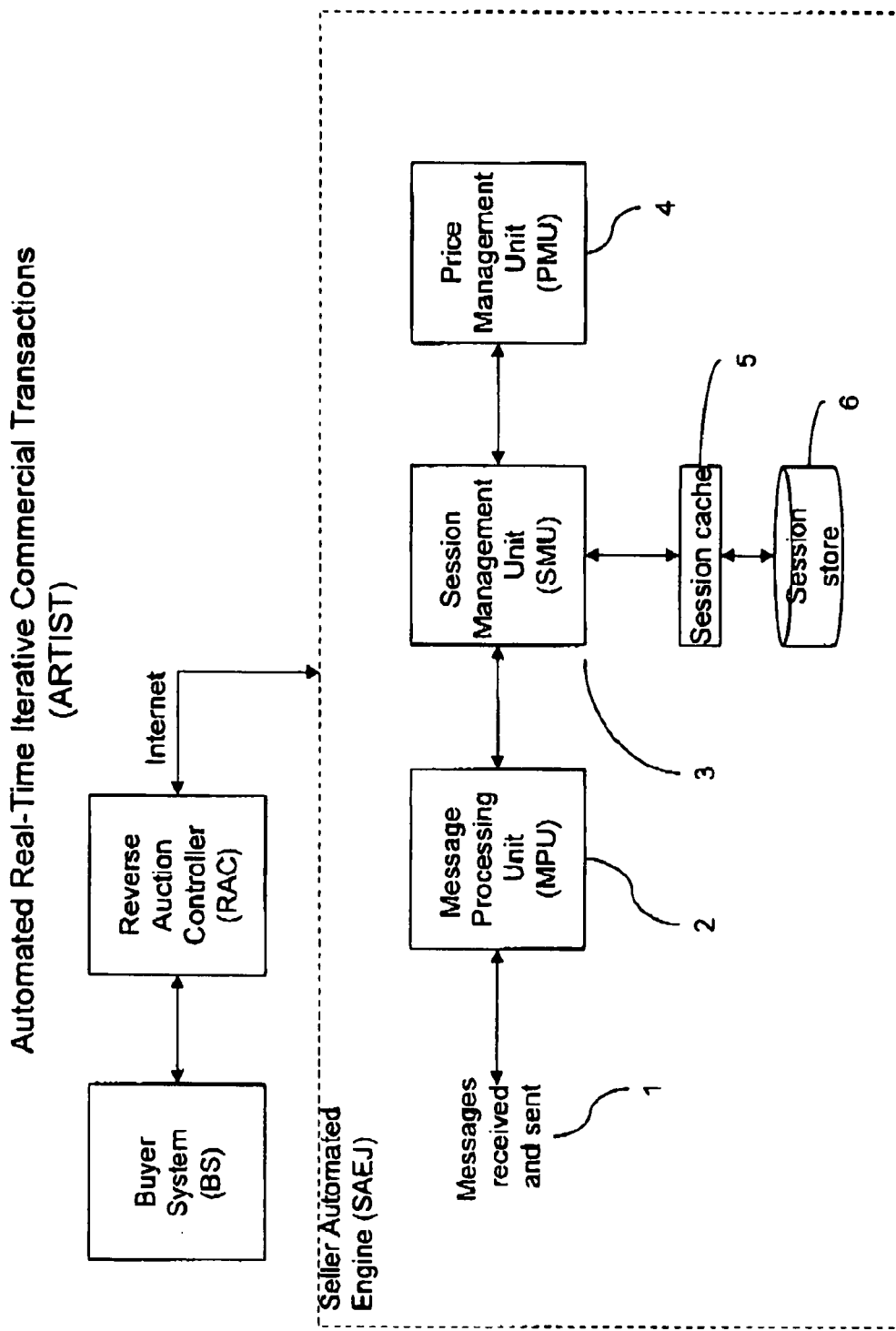

Since the present invention, as earlier mentioned, is concerned preferably and primarily (though not exclusively) with price management implementations in the [ARTIST] type or similar automated real-time iterative reverse auction detailed in said co-pending application, the details of such operation and implementation are not fully repeated herein, but are merely schematically shown as at the top of FIG. 1, as consisting basically of a buyer system (BS), a reverse auctioneer controller (RAC) and a seller automated engine (SAEJ), it being understood that it is intended to incorporate herein by reference the operational and implementation details of the exemplary components illustrated and detailed in the disclosure of said co-pending application.

Structure of the [ARTIST] Type System

The [ARTIST] type system, as before mentioned and summarized, and as explained in said co-pending application, may incorporate a "Buyer System" (BS) implementation (FIG. 1) that may involve, for example, a buyer laptop computer, desktop, PDA or cell phone computers, in on-line connection over the conventional world-wide Internet (so labeled schematically) with a reverse auctioneer controller (RAC). The key features of the buyer's participation, involve on-demand and real-time operation, and the providing of unique buyer shopping portfolios and profiles, specific buyer quotes, and the ability to select desired seller classes.

At the seller side, illustrative custom hardware such as server farms, computer work-stations or mainframes may be implemented with the 'Seller System' seller automated engine implementations 'SAD', and are generally connected over the conventional world-wide Internet to the RAC.

As before discussed, the key features of the seller's participation reside in fully automated bids in real-time, iteratively and automatically modified in accordance with the customer (buyer) specific profile and the current market conditions and also the seller's inputted specific business objectives and constraints as fully described in said co-pending application.

In response to a new buyer registration in the process, or to a profile change, such is transmitted over the Internet to the reverse auctioneer controller RAC. Respective requests for quotes RFQ and for reverse auction (RFRA), for a price watch and/or for automatic notification, or for a price watch and automated purchase, and for bid result acceptance, are all associated with the Buyer System state machine operation, instructing transmission over the Internet to the RAC as in said co-pending application. The buyer input for a price watch as good quotes or reverse auction results are obtained, may include such items as target price, time frame, notification, e-mail or device type format, telephone or SMS number, etc., all as detailed in said co-pending application.

Turning now to the reverse auctioneer or auction controller (RAC) and its sequence of operation in response to received buyer requests, the RAC processing provides for matching sellers, generating initialized unique buyer profile packets, and where there are process responses from seller automated engines SAEJ, for further processing and updating the same.

Responses received from all participating SAEJs are processed and, when all responses have been received, the quote responses are transmitted over the Internet to the Buyer System, while statistics are automatically updated and transmitted back to the SAEJs. These round-trip time computations are updated and when all responses from all participating SAEJs are received, further processing is continued. The bid responses for the buyer's shopping portfolio are thus processed and optimized, with the 'best' bid computed and compared with the previous round of bids, and with the current 'best' bid sent to the SAEJs for the next round of bidding. In the event that the ultimate best bid exists in the last round, the winning SAEJ is selected, the buyer and seller notified, and updated statistics transmitted for the records of the SAEJs, all as fully described and illustrated in said co-pending application.

As before mentioned, the architecture of the [ARTIST] invention of said co-pending application enables fully automated, instantaneous, accurate and competitive quotes from sellers on a twenty four hour, seven days a week basis in response to an on-demand 'Request for Quote' (RFQ) from a 'Buyer System' (BS). It also allows such systems to request at any time on a twenty four hour, seven days a week basis, a true instantaneous reverse auction (RFRA or a request for bid, RFB) amongst sellers, where fully automated seller engines SAEJ iteratively bid amongst themselves in real-time to provide the best bid—i.e. the lowest price for a product or service supplier, or the highest banking interest rate CD, for example. Each seller engine, as earlier mentioned, automatically responds with instantaneous iterative bids specific to: the unique buyer profile, to prevailing and historic market trends, and to competitive dynamics, to the last round lowest bid, dollar and unit volume of the request, and to its own marketing/promotion strategy or business objectives. The bids are dynamically generated to stay within the seller's unique business model-driven constraints; these constraints themselves being further automatically modified within pre-defined hard limits on a product-by-product basis based on historic market data and trend lines. This seller automated engine SAEJ dramatically cuts down the prior-art need and associated substantial expense for manually tracking and comparing thousands of items across hundreds of competitors. The seller, moreover, also has the option to decline participating in bids other than those of its interest, such as within its own class of sellers in order to preserve and protect its own business model.

The buyers not only get instantaneous on-demand response to their requests, but, as before stated, also immensely benefit by this forced real-time iterative competition amongst sellers. Instead of getting a generic price, a buyer does better based on its own unique profile which includes purchasing history, dollar and unit/units volume of its shopping portfolio and its willingness to accept promotions and advertisements. The buyer can also request that only certain class/classes of sellers participate in this iterative competitive bidding for the buyer's business based on its own comfort factor. The buyer also can set a price limit for its desired shopping portfolio, put it on price watch, and if and when matched, receiving notification or automatically effecting purchase, if so chosen. If the price drops even more within a certain time frame, furthermore, the buyer is automatically notified, as for credit.

Such automated on-demand instantaneous buyer-centric reverse auction, will allow the buyer to get the best possible price from multiple sellers, while enabling the same seller iteratively and automatically to compete in real-time for the buyer's business ('price' and 'value' are herein used interchangeably). In case of a buyer looking to buy a camera, for example, the desire is to get the lowest price; on the other hand, a buyer wanting to deposit money at a bank for a year-long CD is looking to get the best rate of interest. The goal is to get best prices for the buyers and yet also to optimize the revenue/profit and other business objectives of the sellers by enabling them to evaluate the buyer demands in real-time, and with the corresponding ability automatically to respond to various situations instantaneously without any manual intervention, based on pre-defined variables and constraints.

It is into this [ARTIST] environment that the present invention, in its preferred embodiments, introduces its improved and price optimizing SAEJ architectural implementations.

The SAEJ of the Invention

FIG. 1 illustrates a high level block diagram for the SAEJ implementation described in the present application. The SAEJ is shown consisting of the following functional units:

1. Message Processing Unit (MPU) 2: The MPU 2 is responsible for sending and receiving all messages to the reverse auction controller RAC. The MPU ensures reliability of communication as well as transformation of RAC messages to object forms understandable by the rest of the SAEJ subsystem, and vice versa.
2. Session Management Unit (SMU) 3: The session management unit 3 is a controller that is responsible for the reverse auction state machine. It ensures that each request from the RAC is processed and that a response is sent back to the RAC. The SMU is also responsible for fault tolerance of the state machines as well as for persistence of session information. For this, the SAEJ maintains a session store 6 for persistent storage of session information, as well as a session cache 5 for fast access to session data. The types of requests received by SAEJ include those previously identified: request for quote (RFQ), request for reverse auction (RFRA and RFB), a request for price watch and an automatic notification, and request for price watch and automatic purchase etc. The SMU processes such requests, as described in the said [ARTIST] application, and also provides additional capabilities, hereinafter discussed.
3. Price Management Unit (PMU) 4: The PMU 4 is responsible for computing optimal prices for all requests from the RAC, including but not limited to RFQ and RFB, specific to each seller's unique objectives. The PMU is one of the unique and innovative functional units of this architecture of the invention, and it is described in detail hereinafter. The PMU is also sometimes referred to herein as the Pricing Engine, and the two terms are used interchangeably.

A principal focus of the present invention is upon several novel embodiments of the PMU 4, which shall accordingly now be more fully discussed.

The Price Management Unit (PMU) 4 Architecture

The PMU implementations 4 described herein consist of two types of pricing functional units: Price Optimizers (PO) and Price Integrators (PI). The role of the price optimizer is to compute the optimal price based on input data such as a buyer request, real-time market data, historic data, etc, and seller configurations; i.e. the parameters programmed by the seller based on its or his unique objectives. The PMU 4 can compute the optimal price based on multiple diverse objectives. In this solution, a group of price optimizers work together to generate optimal price through one or more price integrators, in real-time. The price integrator further enhances the optimizer outputs by integrating additional variables and constraints as provided by the seller. Examples of these variables and constraints may include (but are not limited to):

a. additional constraints on price;

b. variables such as recent historic price, seller's current revenue, seller's current profit, seller's current inventory, seller's current market share, promotions, etc.; and c. additional desirable adjustments applied to the optimizer outputs.

Figure 2:
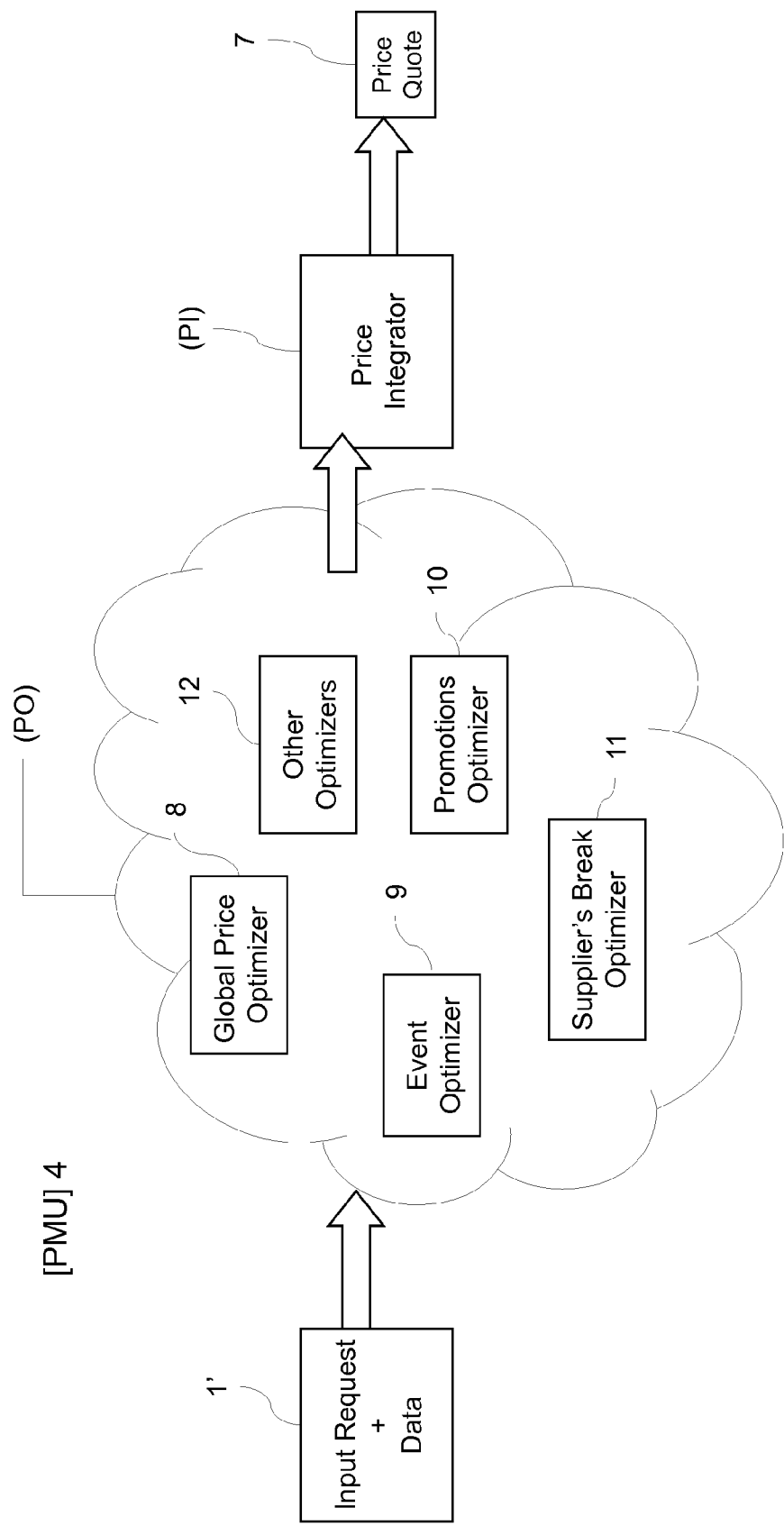
FIG. 2 is a similar flow diagram generically illustrating various types of price optimizers for SAEJ price management units (PMU) of the invention.
Figure 3:
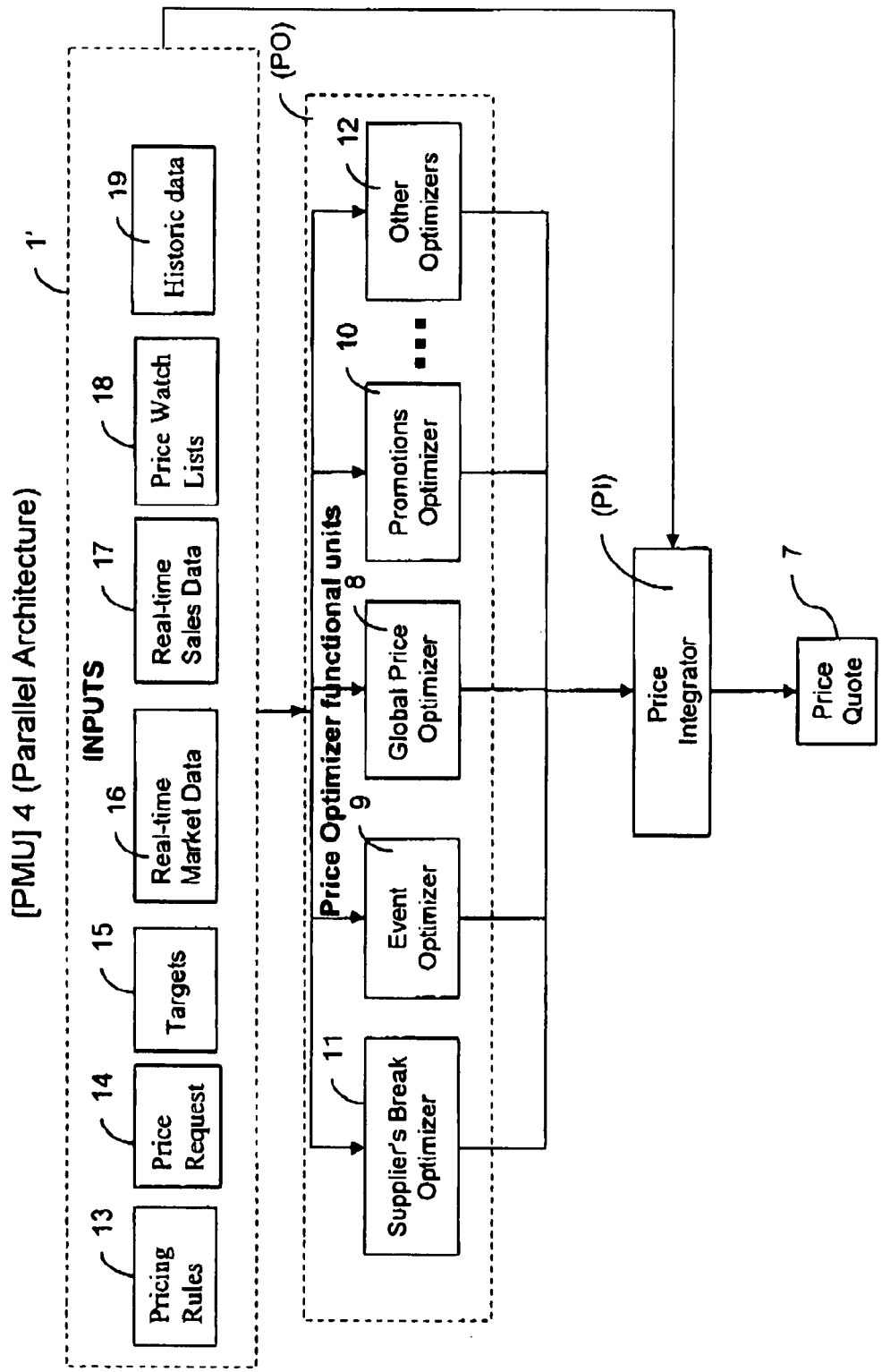
FIG. 3 is a more detailed block diagram of a Price Management Unit (PMU) of the SAEJ, using a parallel architecture implementation.
Figure 4:
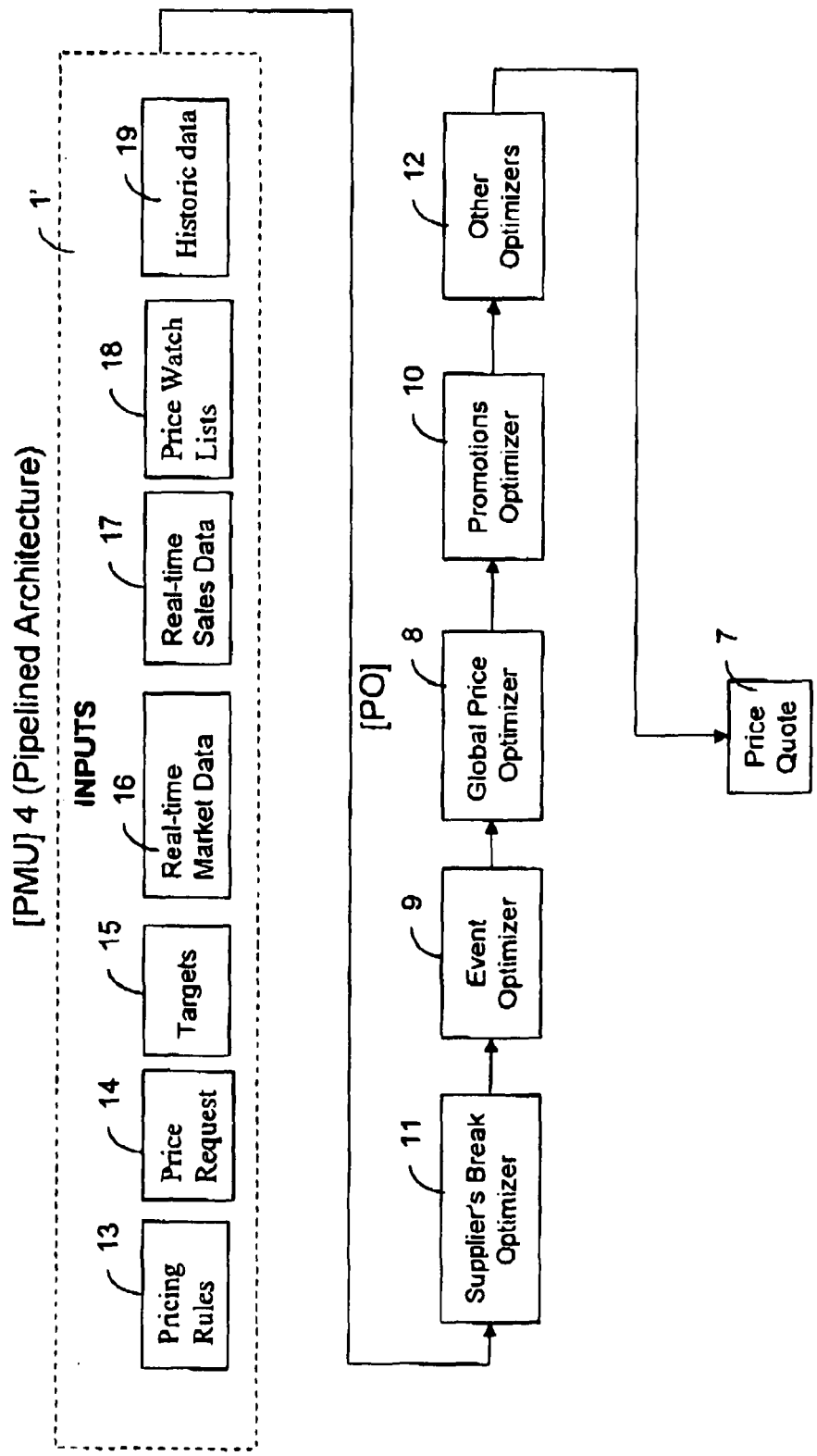
FIGS. 4 and 5 are similar diagrams illustrating pipelined and hub and spoke architecture PMU implementations, respectively.
Figure 5:
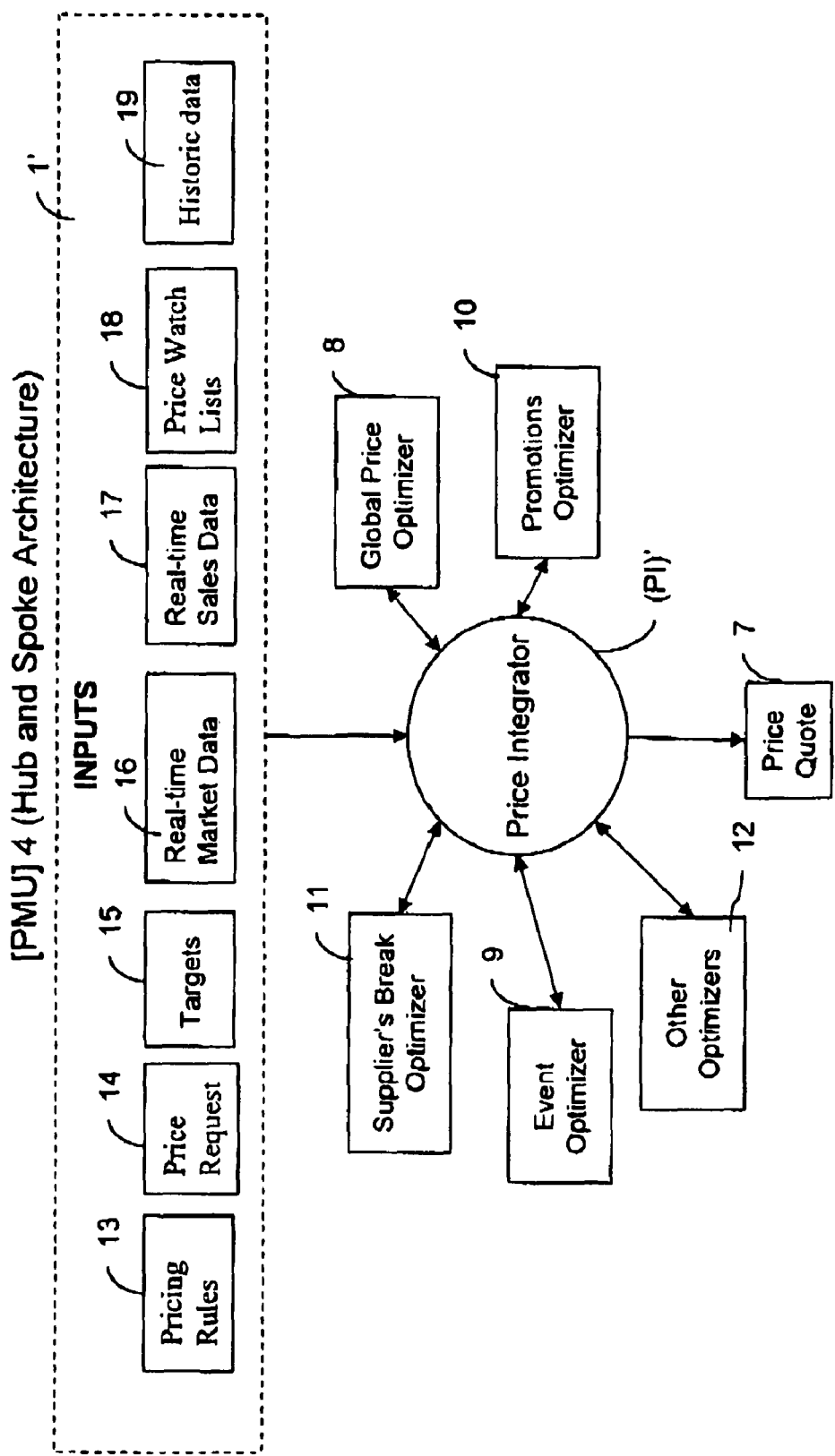

FIG. 2 schematically illustrates such optimizers (PO) as separate blocks, with each optimizer specific to certain goals or certain business objectives of the seller (shown generally in FIG. 2 and specifically under "INPUTS" in FIGS. 3-5, as for the illustrative optimizing of global prices 8, events 9, promotions 10, supplier's break points 11, and other optimizers 12, etc.) The price optimizers PO receive the input requests and data at $1^1$, including the specific inputs of FIGS. 3-5, shown as real-time market data 16, historical data 19, seller's targets 15, etc. The optimizers output their individual optimized prices into the price integrator (PI) that processes the prices along with all the other inputs and sends a price quote at 7. The optimizers in FIG. 2 are schematically deliberately shown as free-standing blocks not connected to one another. FIGS. 3-6, however, illustrate specific examples of how they may be connected into the system and with flexible architectures so as to permit implementation of these optimizers in different ways, based on different objectives, as later discussed.

The role of a price optimizer is thus to compute the optimal price based on input data and configuration data—parameters programmed into the SAEJ by the seller, based on the seller's unique business objectives. In addition to a single price optimizer functional unit, however, it is also important to consider also external conditions, such as the previously mentioned and hereinafter more fully described supplier's breaks and promotions, and other implementations that provide solutions to the diverse goals in the earlier discussed challenges of the sellers. In the present invention, moreover, a group of price optimizers may work together to output optimal prices through one or more price integrators. The price integrator further enhances the optimizer outputs by integrating additional variables and business rules as provided by the seller. Examples of such variables and business rules are upper and lower bounds on price; regions of price and/or gross margins in which certain optimizers are given preference over the others; and further group discounts applied to the optimizer outputs.

The PMU of the invention thus consists of a set of one or more price optimizer functional units (PO), illustrated at 8-12 in FIGS. 3-5, that can be applied to various market inputs illustrated at 13-19. As later more fully explained, and earlier intimated, the price optimizers may work independently or dependently to determine the optimal price for their specific target criteria. The output of the price optimizer is sent to a price integrator functional unit (PI) later described in more detail, that determines the best price at that instant; and a request is then sent back to the reverse auction controller. FIG. 2, however, illustrates such optimizers with their outputs sent to the price integrator (PI) before being sent back to the auction controller RAC through the SMU 3.

In this unique implementation, the PMU architecture of the invention is highly modular, allowing the price optimizers to be architected in several ways to accomplish the different goals. FIGS. 3, 4, 5 and 6, hereinafter more fully discussed in detail, illustrate a few different ways of architecting the PMU with various types of price optimizers and integrators.

Parallel Processing Architecture

FIG. 3 illustrates a parallel processing architecture implementation in which each of the before-described optimizers 8, 9, 10, 11 and 12 runs independently of the others, with all optimizers running concurrently. The output results of each optimizer are fed into the price integrator (PI) that processes the price computations received and computes a single optimal price for the request. The price integrator also ensures that the final price is consistent with the constraints specified by the seller. The resulting price quote 7 is sent back to the session management unit 3 of FIG. 1 and then in turn is sent to the RAC. It is clear from this description that the parallel configuration can be implemented so as to maximize the concurrency capabilities of the implementation. The optimizers may be implemented in their own operating system threads, or processed for execution by one or more general purpose CPUs in parallel. In addition, special purpose processors such as a micro-programmable processor or a custom hardware processor may also be implemented for each optimizer, and they may then be run in parallel.

Pipelined Architecture

In FIG. 4, an example of a pipelined architecture for the price optimizers is presented. In this configuration, the result of each optimizer (PO), is serially fed (8-12) into the next optimizer and a request goes through the optimizers sequentially in pipeline fashion. In this case, each optimizer may have an integrator function built in that uses the previous result to compute the next result, all in real-time. The price quote result 7 of the final optimizer is sent back to the SMU 3 of FIG. 1 to be returned to RAC. For more efficiency and increased throughput, request pipelining is used to ensure that each optimizer is always processing a request. In this case, queues may, indeed, be inserted between optimizers to buffer requests until the next optimizer in the pipeline is ready to process it. PMU may have more than one such pipeline configuration if so desired; for example, to improve the performance, or to process similar or dissimilar variables, resulting in further optimization across product lines.

Hub-and-Spoke Architecture

Another variant of the architecture useful with the present invention is shown in FIG. 5—a hub-and-spoke architecture for the optimizer. In this architecture, the price integrator (PI)[1] acts as a hub and the individual price optimizers 8-12 are the spokes that communicate with the hub. The integrator decides when to send the request to each optimizer and how to combine the results. The integrator may choose to send the requests in series, or in parallel, or a combination thereof, and process the results in real-time based on the seller's objectives.

Hybrid Architecture

Figure 6:
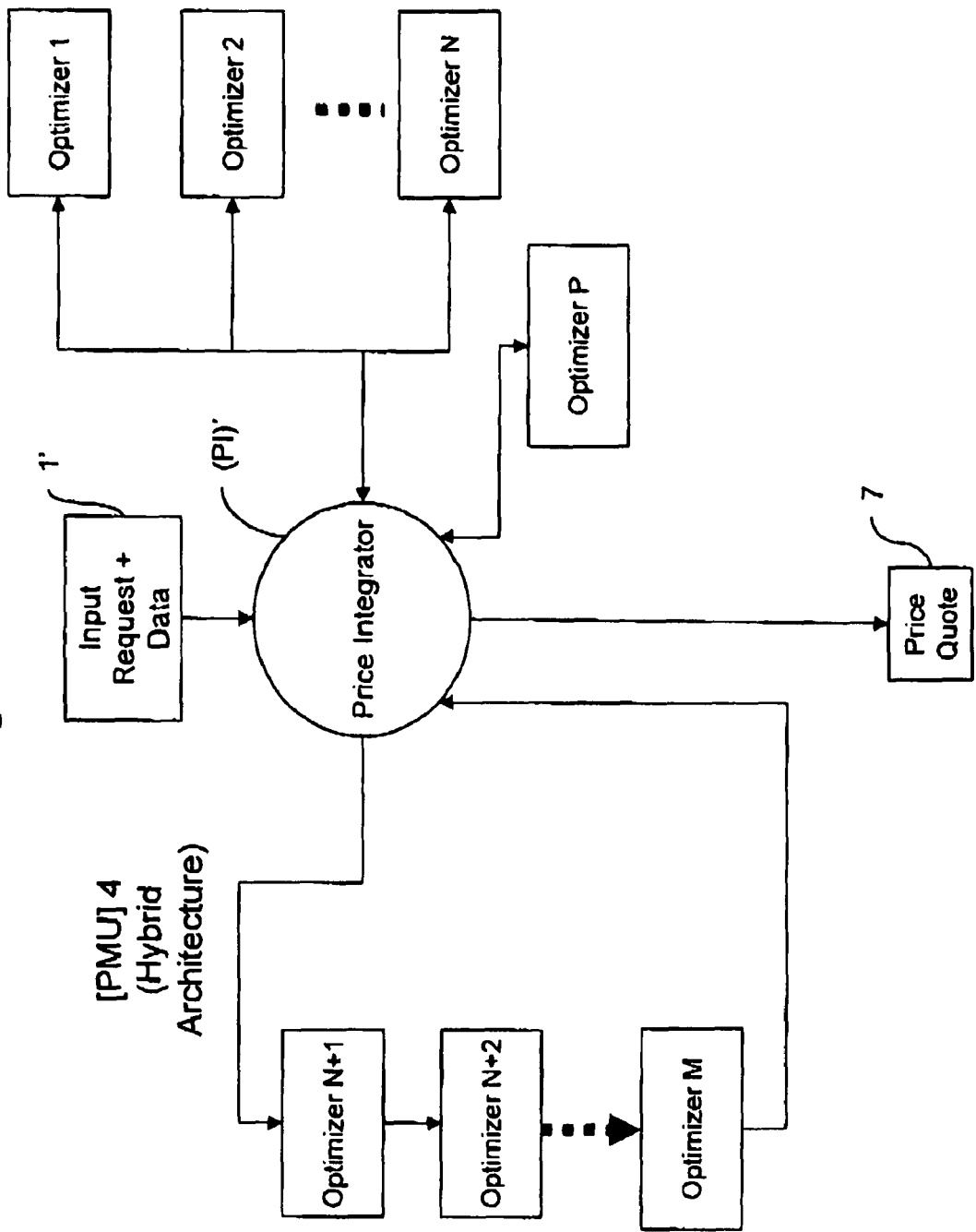
FIG. 6 illustrates a hybrid type PMU architecture.

FIG. 6 illustrates a hybrid approach to the PMU architecture where again the price integrator (PI)[1] forms a central hub, with the spokes being further sub-configurations of the optimizers, including both independent and dependent variations. As shown, for example, one spoke may be a parallel optimizer configuration, (Optimizers I–N at the right), while another may be a pipelined configuration (Optimizers N+L through M at the left), and yet others may be individual optimizers as at P, or any combination of the above. It is easy to see that this implementation covers any arbitrary way of architecting multiple price optimizers with a price integrator, all as determined by the objectives of the seller.

The Price Optimizer Architecture

Based on the different types of seller objectives, the price optimizer architectures of the invention can enable several types of price optimization, including:

a. sales target optimizers;
b. market share optimizers;
c. event optimizers;
d. supply-break optimizers;
e. price watch optimizers;
f. other optimizers;

The architecture flexibility of the invention provides the ability for multiple optimizer types, as well as multiple optimizers of each type, to coexist independently or dependently, based on the PMU configuration. As an example, a retailer may configure the PMU with independent optimizers for home electronics goods, and DVD movie products. In this scenario, the performance or market conditions of one, has no impact on the other optimizer. On the other hand, a bank may configure autoloans to be dependent on Certificates of Deposits (CDs). In this case, the amount of deposits collected by the CD optimizer serves as an input to the auto-loan optimizer, so that the auto loans will never exceed a certain configured percentage of the CD deposits. Each optimizer can thus be configured for one of several implementations to compute optimal price, as well as to change the implementation dynamically based on particular seller configurations and/or upon changing market conditions. Such implementations include earlier mentioned:

1. Market share—directed implementation;
2. Sales target—directed implementation;
3. Utility derivative—following implementation;
4. Model optimizer with exploration implementation; and
5. Rules engine implementation.

It should be noted that the "type" of optimizer is determined by the seller's objectives; whereas the implementation used by the optimizer, enables achievement of these objectives. Each optimizer, such as the illustrative price optimizers 8-12 before described in connection with FIGS. 3-5, regardless of type, can be configured to use any of the above pre-specified implementations, and can, indeed, change its preferred implementation dynamically, based on the seller configuration.

The following table, TABLE 1, is an illustrative matrix of such price optimizers and the suitable respective implementations presented in this application.

TABLE 1

|  | Market share-directed implementation (1) | Sales Target - directed implementation (2) | Utility derivative- following implementation (3) | Model optimizer with exploration implementation (4) | Rules engine implementation (5) |
| --- | --- | --- | --- | --- | --- |
| Sales target optimizer (A) [8, FIGS. 3-5] | A1 | A2 | A3 | A4 | A5 |
| Market Share optimizer (B) | B1 | B2 | B3 | B4 | B5 |
| Event optimizer (C) [9, FIGS. 3-5] | C1 | C2 | C3 | C4 | C5 |
| Supply break optimizer (D) [11, FIGS. 3-5] | D1 | D2 | D3 | D4 | D5 |
| Price watch optimizer (E) | E1 | E2 | E3 | E4 | E5 |
| Other optimizers (F) [12, FIGS. 3-5] | F1 | F2 | F3 | F4 | F5 |

(A) Sales target optimizers listed in the left-most column of TABLE 1 generate the optimal price for achieving the sales targets, such as revenue, profit, sales volume and other sales targets. Specific examples of some such sales targets are:

1. Revenue targets determined at intervals, such as annually, quarterly, monthly, weekly, daily and/or any and all combinations of these and others. In the case of retail sales, the seller may have a revenue target of $1 m for selling TVs in Q1, $0.5 m in Q2, $2 m in Q3 etc. As an additional example, in the case of bank CDs, the bank may have a target deposit need for $15 m in 2 weeks because of a lending commitment made by the bank. As yet another additional example, in case of credit cards, the issuer may have a target loan amount (could be measured using the credit limits on each card) with a certain configured blended credit profile of the cardholders.
2. Profit targets determined annually, quarterly, monthly, weekly, daily, and/or any and all combinations of these and others. The retailer selling TVs could target a profit of $100 k in Q1, $60 k in Q2 etc., as examples. For the bank, the profit may be a function of the spread between the lending rate (or some other benchmark rate) for the funds and the cost of acquiring the funds (interest paid+ other costs). It is clear that the profit and revenue targets at times could be in conflict. In order to meet revenue targets, the seller may be inclined to drop the price to sell more units. Lowering the price, however, could adversely affect the profit targets, while raising price may adversely affect revenue targets.

3. Sales volume targets determined annually, quarterly, monthly, weekly, daily, and/or any and all combinations of these and others. For seasonal products, the cost of carrying excess inventory could be extremely high. Sellers typically determine sales volume targets for various time durations based on their business cycle and other factors. The goal of achieving a sales volume target at times may have a conflict with both profit and potential revenue targets. If the seller sells at too low a price, the sales volume target may be met, but not the profit target; and depending on how many units were sold and at what price, not the revenue target, either.

Sales target optimizers are best suited to use the target-driven implementation (A2), of TABLE 1, but could also use any implementation (A1, A3, A4, A5) based on a seller's objectives, as well as permitting switching between implementations dynamically, as per configuration.

(B) Market share optimizers generate the optimal price for achieving and maintaining a seller-specified market share. As discussed earlier, market share is often used as a growth indicator and the seller may have specific growth targets to be achieved over a specified time period. Alternatively, reducing or maintaining current market share could also be a goal. This may be relevant when the market price is falling and the seller must quickly decide to compromise on the sales targets and just maintain a market share compared to its competitors. It may also be pertinent in a rising market where the seller may be exceeding sales targets, yet may be falling behind on market share. In this case, the seller may want to use the market share as a tracker to stay abreast of the competition. Market share optimizers are best suited for the market share-directed implementation (B1) or the rules engine implementation (B5) of TABLE 1.

(C) Event optimizers of the third row of TABLE 1 generate the optimal price for both planned and unplanned events. These events can be considered as temporary promotions that are put in place to achieve certain specific objectives. Some examples of planned and unplanned events are:
a) changes in competitor prices. A seller would typically not have any advanced notice of competitive changes. As a result, this would be an unplanned event and the seller would have to quickly react to the changes; and
b) planned promotions run by competitors, such as seasonal promotions for Thanksgiving/Christmas sales etc. which are typically known in advance; and unplanned promotions by competitors of which the seller has no advance knowledge, but must quickly adapt to counter.

The event optimizers may also use any of the implementations (C1, C2, C3, C4, C5) as listed in TABLE 1, as well as switch between implementations dynamically.

(D) Supply-break optimizers generate the optimal price for achieving the supply break. As a retailer reaches certain sales volume numbers sufficiently close (as determined by the seller) to a supply break, the seller may want to run a short-term promotion, aggressively to sell more units and achieve the supply break, assuming the short-term reduction in profitability is more than offset by the reduced cost gained from the supply break. This is in contrast to existing technologies where there is no way to react quickly to a supply-break opportunity.

The supply-break event may be considered a special promotion event during which the seller is trying to achieve the supply break targets. In this case, the seller will typically provide the following information for a supplier's break:
a) information about the break itself: quantity, price etc.; how many units in advance to initiate the supply-break event in order to reach the break point; and
b) how much time is available to reach the supply break; and appropriate price constraint, in case a new one is desired.

This optimizer can then make use of the target-directed implementation (D2) of TABLE 1. The target is to sell N more units prior to the expiration of the specified duration. The parameters of the implementation can be different from the global price optimizer. That optimizer may also use any other implementations, such as (D1, D3, D4, D5) of TABLE 1.

(E) Price watch list optimizers use the buyer's price watch lists (transmitted to the SAEJ by RAC) as a collective demand or an aggregated order. Based on the pre-specified constraints, a partial list of requests may be fulfilled. The advantage for the price watch lists is that it allows the seller to maintain and track buyer desire to purchase products at certain price points determined by the buyers. Such an optimizer may well use any of the implementations (E1, E2, E3, E4, E5) of TABLE 1.

(F) Other optimizers may also be created as desired by the seller. The architecture provides the ability to define new optimizers based on the seller unique objectives and the ability for the optimizers to use any suitable implementation (F1, F2, F3, F4, F5) of TABLE 1 and change implementation via seller configuration or otherwise, dynamically.

One of the key additional advantages of this unique architecture is the ability to design optimizers suited to each vertical, or across-verticals, subject to the seller's unique objectives. As described earlier, the PMU architecture of the invention enables multiple price optimizers to function in a variety of parallel, pipelined, dependent and/or independent ways and/or any combination of these. Each optimizer may flexibly be of any type above, and may use any implementation, as described. The optimizers, in conjunction, will optimize for all the objectives as configured by the seller.

It is now appropriate to consider the details of the price integrator (PI) that receives the price optimizer outputs.

The Price Integrator Architecture

The price integrator is effectively a super-optimizer, optimizing across the output of each feeder optimizer, coupled with additional other inputs, in a manner such as to produce a final optimized result across the board. The price integrator then makes price decisions by applying computation, logic and/or pricing rules (or any combination thereof) on outputs from the price optimizers and other external inputs (price request, targets, real-time sales data and price watch lists etc.).

Computation-centric-only implementations may be quite different from pure rule-based implementations. As an example, in the parallel architecture of FIG. 3, a simple price integrator PI may use the best price from the parallel optimizers. In a more complex embodiment, the integrator may use any (or a combination) of the above optimizer implementations to further optimize the price computed by the optimizers. In yet another embodiment (as described in the hybrid architecture of FIG. 6), the price integrator acts as a hub responsible for sequentially, and/or in parallel, invoking groups of dependent and independent optimizers. The integrator processes the results of the optimizers as it invokes them, uses the results as additional inputs into the next set of dependent optimizers, and invokes them. The invocation is determined by complex logic, computation, rules engines, prevailing market conditions, or any combination of these. As a result, the set and sequence of optimizers invoked may change dynamically based on previous optimizer results as well as prevailing market conditions. The integrator is then ultimately responsible for producing a final price at 7 for the request.

The price optimizers of the invention, together with the price integrator, thus allow the seller to achieve his or its objectives simultaneously while dynamically changing the priority of each objective based on current market conditions, current fill status, and function of time, and a variety of other factors.

As earlier described, the set of novel price optimizer implementations of the invention enables the seller to optimally achieve pre-set objectives optimally without accurate advance knowledge of demand, buyer characteristics and competitor behaviors. It is now in order to examine such implementation in greater detail.

Price Optimizer Implementations

In general, such implementations can be broadly categorized either as quantitative implementations or rules-based implementations. The rules-based approach, while simple, does not scale as well as the quantitative solution. As an example, a rules-based solution typically requires the designer to consider all possible cases including complex inter-variable relationships, and then write rules for each one of them. As the requirements evolve, there is need to continually update them, correspondingly. This tends to get very complex and quickly non-scalable. It is difficult to maintain and upgrade, unlike a quantitative solution, which, though difficult to conceive, is highly scalable, solved, and is easy to maintain and upgrade.

In the preferred embodiment, of the invention, there are accordingly provided quantitative automated solutions to the problem faced by a seller in determining an optimal price in response to a request from the RAC.

Such price optimizer implementations embrace both the before-mentioned rules-based implementations and the quantitative implementations, including those previously discussed; namely:
  a. sales target-directed implementation,
  b. market-share directed implementation,
  c. utility derivative following implementation, and
  d. model optimizer with exploration implementation.

While in theoretical concepts of "market share", "model-based optimization" etc. exists in optimization theory, such is primarily geared towards off-line batch processing applications. What sets the implementation apart of the present invention apart from such prior art approaches, however, is the very different way these concepts are used to solve complex price optimization problems, as outlined above, and in a manner that is automated, real-time, adaptive, flexible, configurable, dynamic, iterative and applies to multiple buyer, multiple seller marketplaces, such as the [ARTIST] or any similar marketplace.

Rules Based Implementations

A rules engine may be a software or hardware subsystem that manages complex rules and matches them against inputs and seller configuration. Rules engines typically use pattern-matching algorithms such as the "Rete" algorithm. In the implementation of the present invention, also, any rules engine may be used, but with a highly novel ability to apply rules to a real-time iterative reverse auction in a dynamic fashion, while using other optimizers in conjunction to determine optimal price—this being one of the novel aspects of the invention with rules engine implementation involving either or both of price optimizers and/or price integrators.

A pricing rule consists of conditions and actions, with the action part of the rule producing the optimal price quote. Pricing rules are seller-created rules that may be used to make pricing decisions. A simple rule for a price integrator, for example, could be to compute the lowest (or highest or average etc) price from all the price optimizers, while further checking the limits of price as configured by the seller. An example of a rule used by a price optimizer may be a rule to specify certain discounts and/or promotional pricing such as zip-code-based promotion or a consumer index-based promotion or group-membership-based promotion or other such promotion. Rules could also be used to raise the price based upon the happening of certain criteria such as an increase in demand over a threshold. Rules may also be used as a trigger for price watch lists when sufficient buyer demand has accumulated at a certain pre-configured set of prices. The above are just some examples of the numerous ways in which rules can be used to determine price in accordance with prior methodologies.

Rules may thus be represented as decision tables or other formats as required by the specific rules engine—even presentable in a more intuitive fashion using a graphical user interface or a web-based interface to the seller. In cases where a single price optimizer is used, and in case it uses a rules engine to compute the price, the price optimizer and price integrator could, indeed, become one functional element.

A comparison of exemplary rules-based and target-directed implementation may now be in order.

Figure 7:
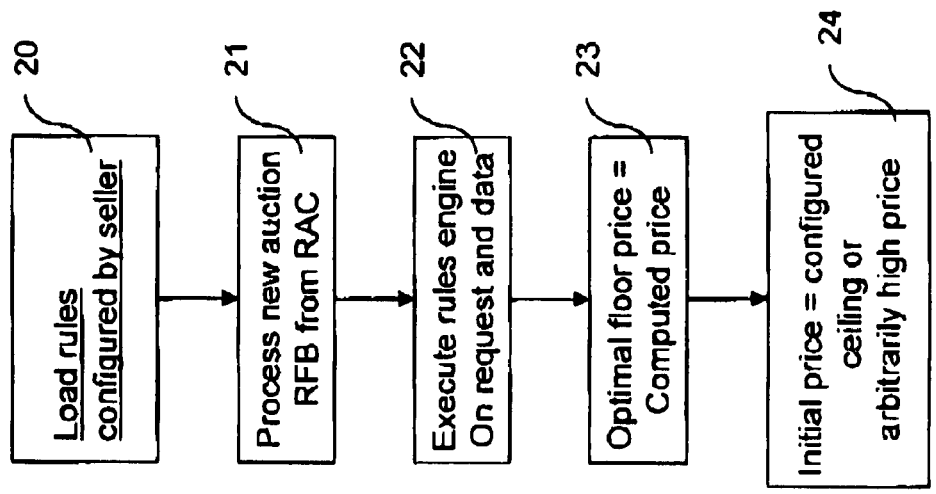
FIG. 7 is a flow chart diagram of a illustrative rules-based implementation.

Exemplary Rules-Based Implementation
(FIG. 7)

A typical implementation using such rules is illustrated in exemplary FIG. 7.

Flow Chart for FIG. 7

1. Initialization
   Load rules configured by seller at 20, FIG. 7;
2. For each new auction (RFB) request received at 21,
   execute the rules engine on request, using market data and configured rules at 22;
   Use resulting price at 23 as optimal floor (ceiling in case of the bank CD example) price for this auction; and
   Use seller-configured ceiling price at 24 if available (floor for the bank CD example) as initial price for first bid. If this is not configured, start from an arbitrarily high price based on previous auctions.

It should be noted that the rules-based implementation does not impose any restrictions on what the price returned to the RAC is to be. This price is returned via the integrator which may be configured in several ways such as, I. For a bid request of RFB or RFQ, the rules engine optimizer is invoked at the start of every new auction, and the price resulting from the optimizer computation, can be used as a temporary computed optimized floor for the next bidding rounds in the same auction. This is an optimized sub-constraint clearly residing within the overall constraints configured by the seller. In this case, the PMU 4 starts with an initial price and iteratively drops the price to the temporary computed optimized floor, or until the auction ends (whichever comes first).

For such RFQ, there are several options available such as:
a. Return the list price configured by the seller. In this case, the optimizer need not be involved.
b. Return the optimal price computed by the optimizer.
c. Apply discounts (or premiums) on the optimal (or list) price and return the resulting price.
d. Integrate prices from several optimizers and return the resulting price.
e. Other possible options based on seller configuration.

This implementation makes no assumptions. Its inputs are only the seller's rules and the request data, the market data and the seller's configuration data used by the rules.

The rules engine, indeed, is typically far easier to conceive than quantitative solutions and may be a preferred choice for simple problems. It enables a simple implementation for price optimizers and/or price integrators and may be used to cover boundary conditions. The rules, moreover, can be directly or indirectly mapped to the seller's objectives and may be intuitive for certain sellers.

Exemplary Target-Directed Implementation
(FIGS. 14 and 15)

The Sales Target-Directed Implementation, as Distinguished from the rules-based implementation, introduces the ability to pursue any quantitative targets specified by the seller. Some examples of such targets are periodic sales targets (such as quarterly revenue, profit, sales volume etc), or specific promotion-driven sales targets (such as sell $100 k worth of the product over a weekend), supplier break targets (sell 1000 units in the next 2 hours) etc. This implementation also provides the ability to the seller to specify the pace with which to approach the corresponding targets, subject to the seller's risk averseness, market perception and other factors as outlined previously. A seller may want to sell more aggressively, for example, when the current revenue is remote from the target revenue (or vice versa), or sell at the same pace regardless of how far away the revenue is from the target. The implementation also provides the ability for the seller to subdivide the target equally or unequally and in any proportion into sub-targets over smaller time intervals—divide a weekly target into daily, or even day/night targets based on day of the week, as desired. This enables the seller to track and measure progress in smaller intervals, as well as sets the appropriate pace based on known qualitative buying patterns.

The target-directed implementation, furthermore, also enables the seller dynamically to increase or decrease the relative priorities of each of the targets in real-time. Sometimes profit may be more important than revenue, while at other times sales volume may be the most important, and so on. This ability to shift the relative degree of emphasis among targets based on prevailing market conditions, or based on the respective distance yet to cover for each target, or the time left in a pre-specified time interval, results in an optimal approach to achieve the targets simultaneously.

The target-directed implementation, moreover, uses the notion of "utility", later more fully discussed, to represent the measure of a seller's perceived value of winning an auction with respect to the targets. In general, the total utility for N incoming requests may be represented as:

$$u = \sum_{i=1}^{N} u_i(p_i),$$

where $u_i$ is the seller utility from winning request i, and $p_i$ is the quoted price. The optimal price offered by the seller can be computed by maximizing the expected utility. It is indeed possible to find the optimal price policy $(p_1, p_2, \ldots, p_N)$ to maximize the expected utility if the request arrival process and competitive price characteristics are assumed to be accurately predictable in advance. Clearly, this unviable assumption of being able to accurately predict the future in real-time in a competitive and dynamic market renders previously known techniques at best marginally useful, and that, indeed, only for off-line batch processing.

In the implementations of the present invention, on the other hand, the optimizations are conducted auction-by-auction in real-time without requiring accurate predictions about the future behavior of the ever-changing highly competitive market. For each auction request received, the implementation computes the price that maximizes the increase in "utility" achieved by winning the auction at that price. The goal of maximizing the utility, moreover, is achieved at a pace set by the seller. Thus this implementation of the invention is generic. It is straightforward, moreover, to map into all verticals, such as the later illustrations of such mapping for Certificates of Deposit (CD) in the banking industry, and in the credit card vertical.

Utility Functions

The above-mentioned seller's total "utility" is defined as a weighted combination of several utilities such as revenue, profit and sales volume utilities. Any number of target utilities can be used to compose the total utility, thus giving the seller the ability to set numerous types of additional targets with appropriate weights. The total utility is computed as:

$$u = w_R u_R + w_M u_M + w_S u_S,$$

where
$u_R$ is the revenue utility
$u_M$ is the profit utility
$u_S$ is the sales volume utility
$w_R$ is the revenue utility weight
$w_M$ is the profit utility weight, and
$w_S$ is the sales volume utility weight, etc.

These weights are typically configured by the seller. Some sellers may want to assign equal weights to targets such as revenue, profit, sales volume etc. Others may value one more than others; yet others may change the weights over time and as market conditions evolve. For example, for a retailer with seasonal apparel, sales volume target may be much more important than revenue or profit at the end of the season. If a product is selling below expectations, the seller can increase the sales volume weight substantially over the weights of other targets. If not configured by the seller, equal values for the weights may be used. The configurable weights provide the ability for sellers to assign emphasis (or de-emphasis) to each of their targets.

In the later-described target-directed implementation of FIGS. 14 and 15 herein, the utilities are functions of respective "distances" to targets, the "distance" being the quantitative measure of how far away the seller is from the specified target. For example, if the target revenue for Q1 is $10 m, and on February 1, the current revenue is $3 m, then the "distance" for the revenue is a function of ($3 m/$10 m).

Different forms of utility functions may be used by each seller subject to its own unique objectives. The utility function provides the ability for the seller to specify the pace/aggressiveness with which to approach the target. Some examples will now be presented, through the system of the invention allows the use of any utility function desired.

Linear Utility Function

The linear utility function is computed as the achieved revenue, profit and sales volume etc so far, normalized by respective targets in the specified time interval. For example, the revenue utility is (at time "t"), $$u_R = \frac{R_t}{R_T} \quad (1)$$

where $R_T$ is the pre-specified target revenue over time interval T, and $R_t$ is the current revenue achieved at time "t≦T".

This utility can be further weighted with respect to other utilities by using seller configuration as shown in the previous section.

The linear utility can also be represented as a function of the "distance" to the respective targets. For example, the distance of revenue from the revenue target and a simple corresponding linear utility can be defined as $$d_R = \frac{R_t}{R_T} - 1 \quad (2)$$
$$u_R = 1 + d_R.$$

The weighted distance is then $$d = w_R d_R + w_M d_M + w_S d_S. \quad (3)$$

The distance "d" is a quantitative, yet intuitive measure of how far the seller is from his targets. For example when the current revenue ($R_t$) is 0, the revenue distance $d_R = -1$; and so long as the revenue is less than the revenue target, the revenue distance is negative indicating that the target is not yet achieved. When $R_t = R_T$ (i.e., the seller has achieved the target), the revenue distance=0. As the seller exceeds the target, the corresponding "d" becomes positive. The total linear utility is thus, $$u = 1 + d. \quad (4)$$

This is a simple form of the linear utility function, with a more general form being $$u = 1 + ad. \quad (5)$$

Figure 8:
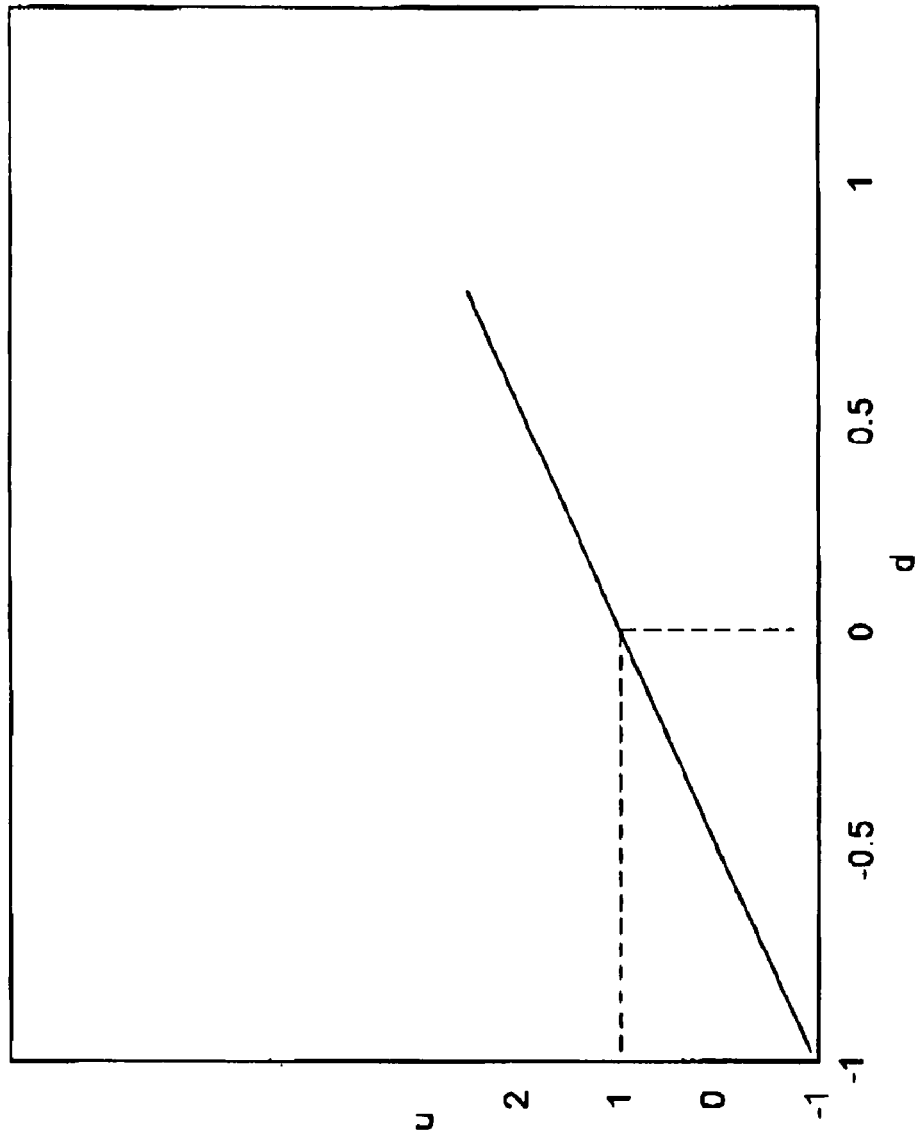

This simple form of the linear utility function is illustrated in FIG. 8. With such a linear utility function, the seller approaches the target with a constant slope indicating that the gain in utility from reducing the distance by one unit is constant no matter how far the seller is from the target. The slope parameter "d" indicates how aggressively the seller approaches the target.

When a new auction request is received, the expected utility from winning the auction is $$u = w_R \frac{R_t + Q\rho(p)p}{R_T} + w_M \frac{M_t + Q\rho(p)(p-C)}{M_T} + w_S \frac{S_t + Q\rho(p)}{S_T}, \quad (6)$$

where
- $w_R$ is: Revenue utility weights.
- $w_M$ Profit utility weights.
- $w_S$ Sales volume utility weights.
- Q Number of units
- p Unit quote price by seller. This is the variable being optimized.
- ρ(p) Historic bid-response function, typically a representation of recent historic market price "p" computed using a seller preferred duration of history.
- C Unit cost for seller as configured by seller.
- $R_t$ Achieved revenue so far.
- $R_T$ Revenue target as configured by seller, where T is the total time to achieve the target.
- $M_t$ Achieved profit so far.
- $M_T$ Profit target as configured by seller where T is the total time to achieve the target.
- $S_t$ Achieved sales volume so far.
- $S_T$ Sales volume target as configured by seller where T is the total time to achieve the target.

The optimal price is computed by maximizing this utility equation.

The linear utility function can be considered as a risk-neutral way to reach the target. This means that no matter how far away the seller is from the targets, the additional gain in winning the next auction request does not change. This form of utility function is typically a reference function and is easy to use and provides diversification to changing market conditions.

Piecewise Linear Utility Function

Figure 9:
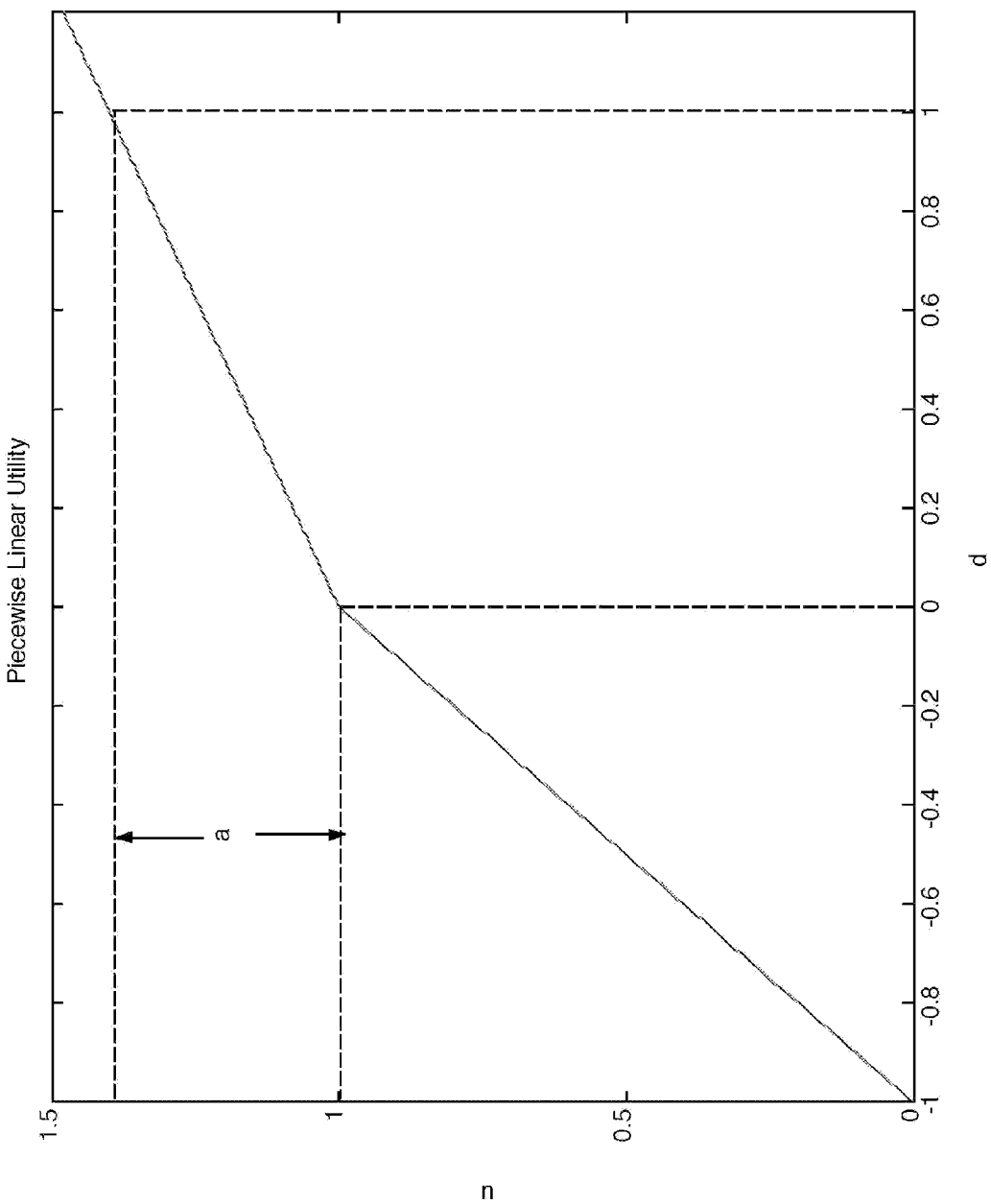
Figure 9:
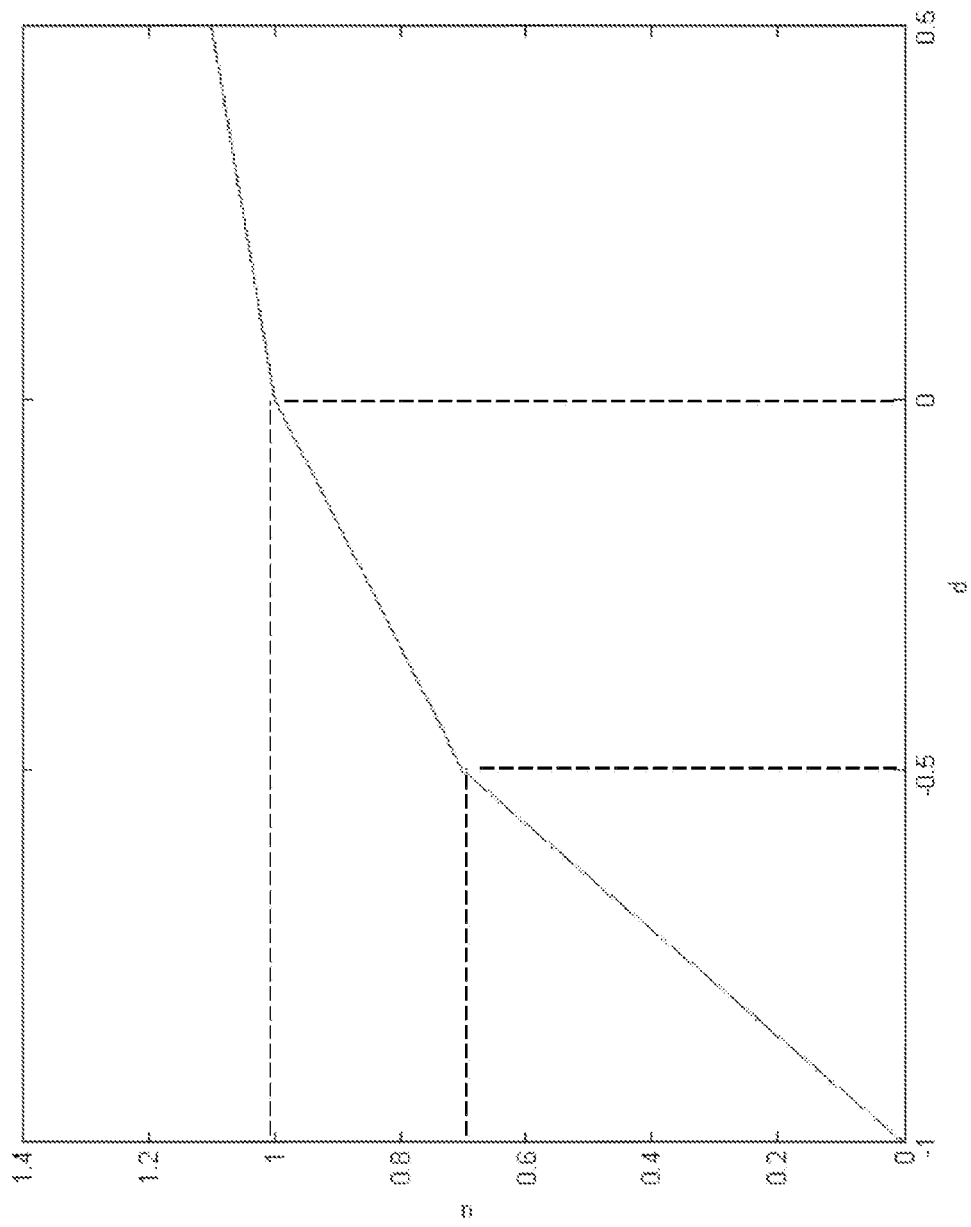

The piecewise linear utility function allows the seller to change his or its utility gain at arbitrarily chosen discrete distances to the target. This enables further optimization for the more sophisticated seller. A sample piecewise linear utility curve is shown in FIG. 9 (a).

In this example, using the previous definition of "distance", the piecewise linear utility function can be defined as $$u = 1 + d, \quad (7)$$

if d≦0; and as $$u = 1 + ad, \quad (8)$$

if d>0.

"a" is a factor to measure aggressiveness after the target has been reached. If "a" is chosen to be <1, it is less aggressive; and if a>1, it is more aggressive. In general, the total utility is a weighted combination of several (two, in the above example) piecewise linear utilities. In FIG. 9 (a), parameter "a" is the additional utility gain when the achievement doubles the target, assuming the utility is 1 when the target is just met. In the figure, a=0.4. The seller configures this value as desired.

It may be noted that the figure is just an example where the slope changes at d=0. This, however, could be any value of d, and in general, the slope could change at multiple values of d. FIG. 9 (b) illustrates a piecewise linear utility function with three pieces, each with a different slope.

Exponential Utility Function

An exponential utility function has the form $$u = A - Be^{-ad} \quad (9)$$

where A and B are scaling parameters, a is a factor to measure risk aversion and d is the normalized distance to the target. When d<0, it is below the target; when d=0, it is at the target; when, d>0 it is above the target.

Figure 10:
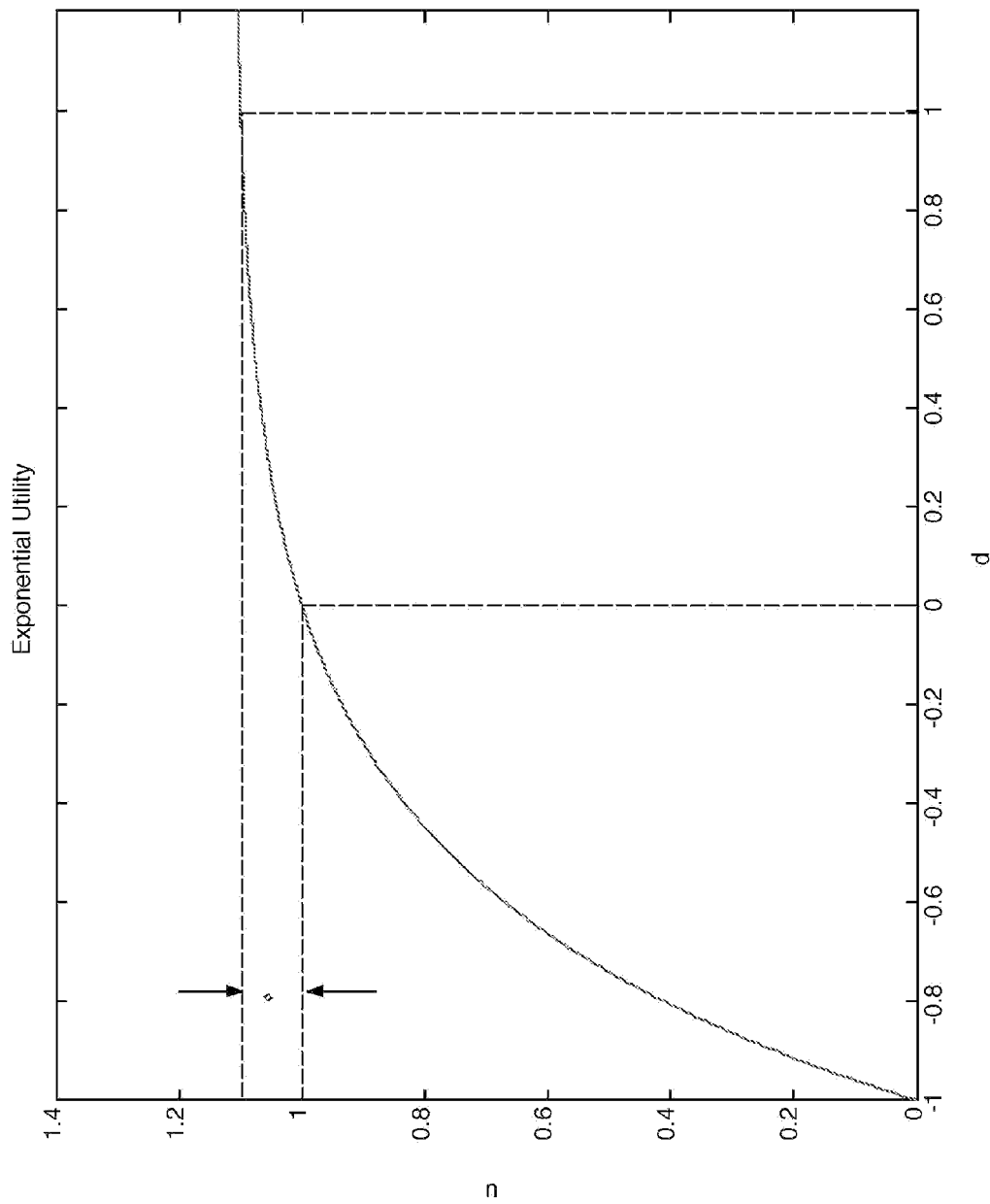
Figure 10:
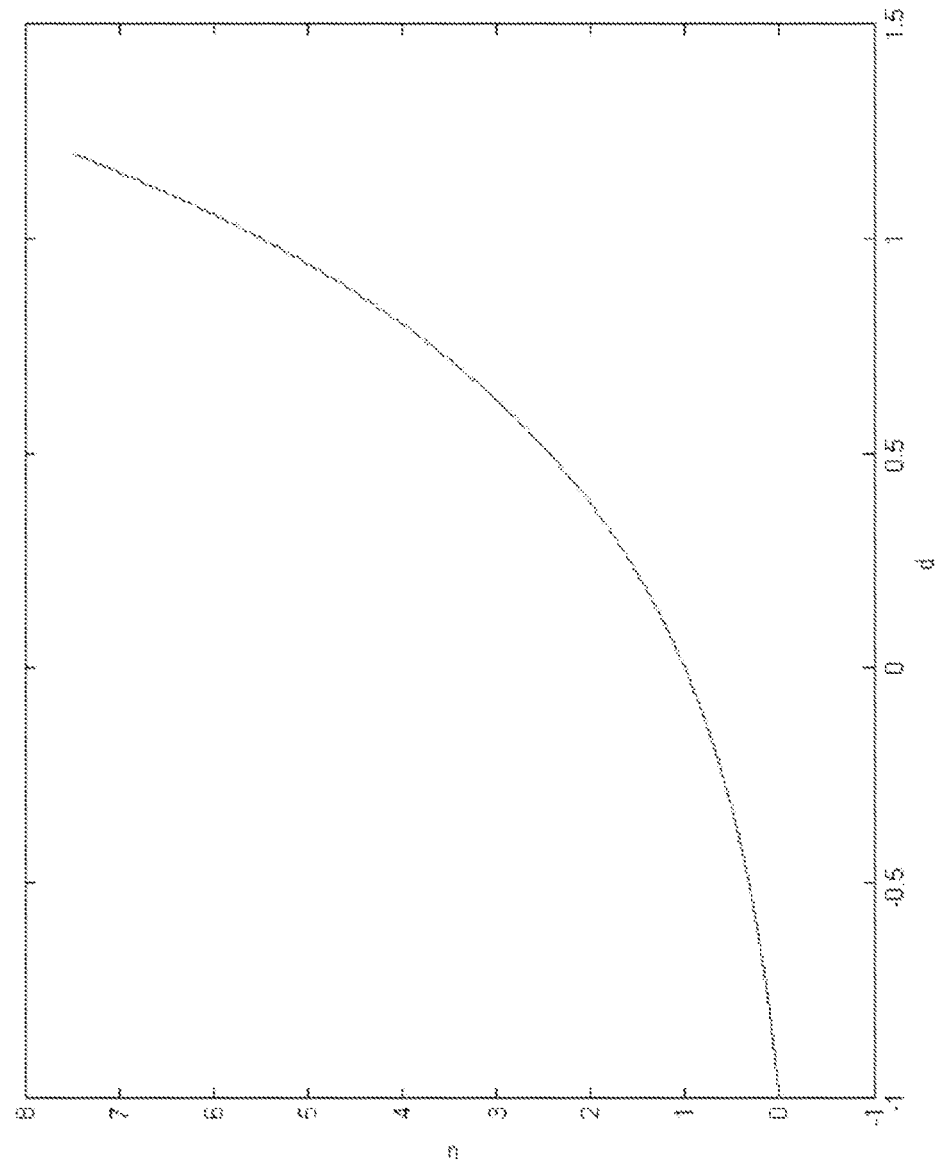

A sample exponential utility curve corresponding to the above equation is shown in FIG. 10 (a).

This exponential utility has the several properties that may represent desired seller behavior. For example:
1. When distance to the target is large, the additional gain in utility (represented by the slope of the curve) is also large. This enables the seller to approach the targets more aggressively when he is further away from the targets. The degree of aggressiveness is entirely seller selectable thus giving the seller countless configuration options to meet his own objectives.

2. As the distance to the target goes to 0 from a negative number, the slope decreases, thus reducing the additional utility gain from winning the next auction. This represents a seller's state where things are going well, and the seller starts to become less aggressive.

3. After the target is met, the slope further decreases. This reflects the type of seller who has very little incentive to exceed the given target.

Parameter "a" is a factor to measure the aggressiveness when the seller pursues the target, and it is configured by the seller.

As an illustration, suppose the additional utility gain from doubling the target is α, (shown in FIG. 10 (a)), parameters A, B and a are determined by solving the following equations:

$$A-B=1$$

$$A-Be^a=0$$

$$A-Be^{-a}=1+\alpha \qquad (10)$$

The equations reflect three situations: 1) when d=−1, u=0; 2) when d=0; u=1; 3) when d=1, u=1+α.

The above-defined exponential utility function has the unique property that the smaller α, the more aggressive it is when pursuing the target before reaching the same target. When a gets bigger and bigger, it gets closer and closer to the linear utility function, and it becomes less and less aggressive below the target. It is this ability to go from highly exponential to linear that makes this approach very attractive.

The expected utility with one additional bid request is $$u=w_R(A_R-B_R\exp(-a_R d_R))+w_M(A_M-B_M\exp(-a_M d_M))+w_S(A_S-B_S\exp(-a_S d_S)). \qquad (11)$$

Here A, B and a are exponential utility function parameters, and $d_R$, $d_M$ and $d_S$ are normalized distances to targets. They are defined as $$d_R = \frac{R_t + Q\rho(p)p}{R_T} - 1 \qquad (12)$$

$$d_M = \frac{M_t + Q\rho(p)(p-C)}{M_T} - 1$$

$$d_S = \frac{S_t + Q\rho(p)}{S_T} - 1.$$

We can also define a weighted exponential distance to targets as $$d=W_R\exp(-a_R d_R)+W_M\exp(-a_M d_M)+W_S\exp(-a_S d_S). \qquad (13)$$

As before, the optimal price is computed by maximizing the weighted utility function. The maximization of the weighted exponential utility function is equivalent to the minimization of the weighted exponential distance to targets. When each request is received, the target-directed approach will try to minimize the distance to the target.

Another embodiment of the exponential utility type function is illustrated in FIG. 10 (b).

$$u=-A+Be^{ad} \qquad (14)$$

This function has the unique property that it approaches the target less aggressively when the distance to the target is large, and gets more aggressive as the distance to the target decreases. Such properties may represent a desired seller behavior; for example:

1. When the distance to the target is large, the additional gain in utility (represented by the slope of the curve) is small. This enables the seller to approach the targets slowly when he or it is further away from the targets. As before, the degree of aggressiveness is entirely seller selectable, thus giving the seller countless configuration options to meet his or its own objectives.

2. As the distance to the target goes to 0 from a negative number, the slope increases, thus increasing the additional utility gained from winning the next bid. This represents a seller's state where the seller starts to become more aggressive.

After the target is met, the slope further increases; reflecting that type of seller who has extremely high incentive to exceed the given target.

Figure 11:
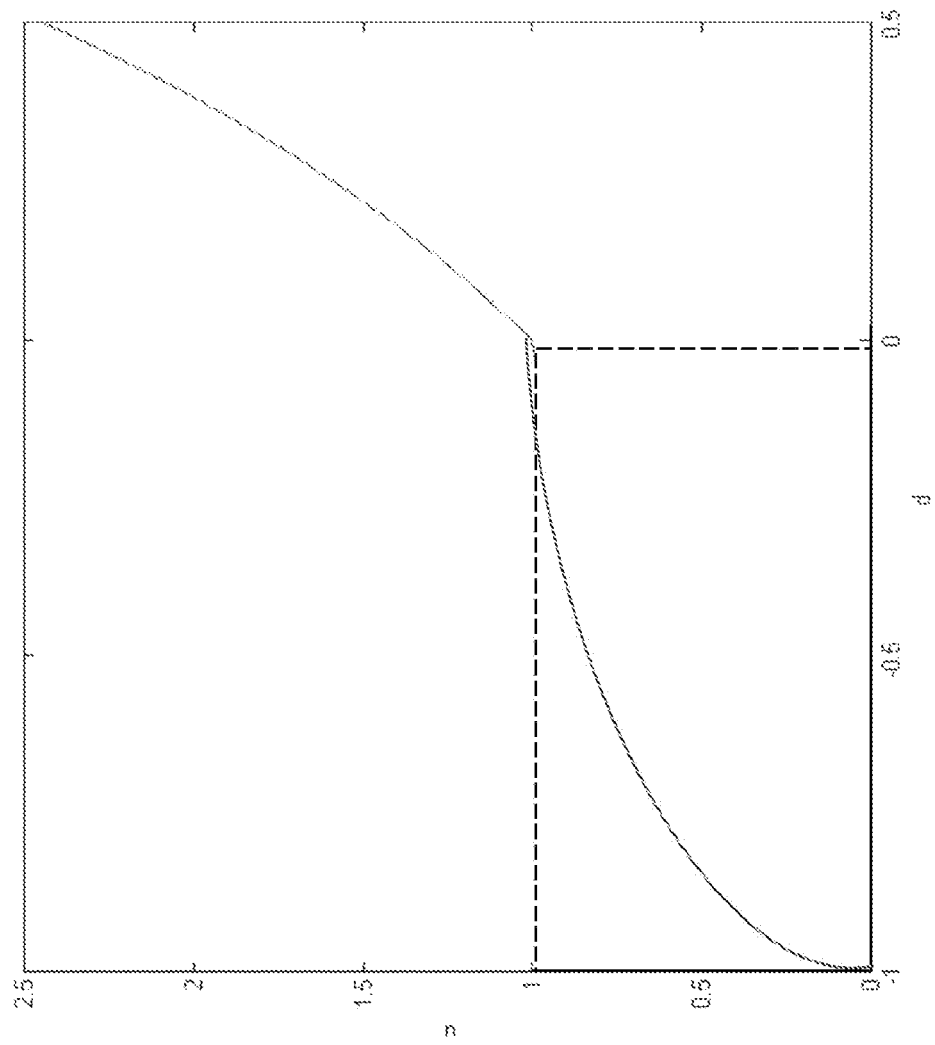
Figure 11:
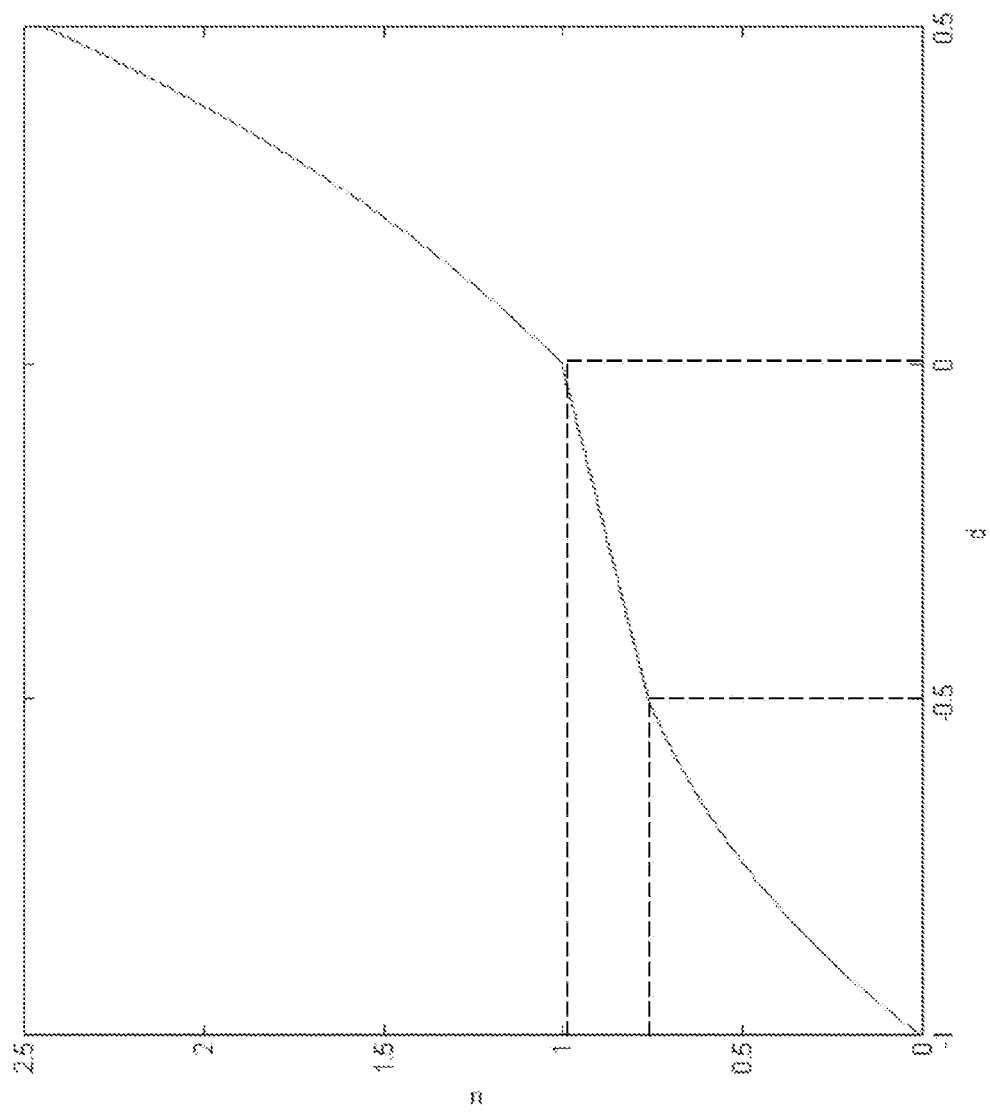

In addition, a piecewise exponential utility function may also be used as shown in FIG. 11 (a), which enables the seller to adjust aggressiveness as desired.

Hybrid Utility Function

As is evident from this discussion, the novel implementation of the invention allows any utility function or a combination of heterogeneous utility functions to be used (such as a piecewise exponential, a combination of piecewise linear or polynomial, and exponential, etc.) to represent each seller's unique objectives as the distance from the target varies. The selection of the utility functions can also be changed by the seller via configuration.

The hybrid utility function provides a powerful ability to vary the aggressiveness of the optimizer based on the distance to the target. The hybrid function consists of multiple pieces of linear and exponential utility functions as desired by the seller. As the distance to the target varies, different function forms can be used based on the seller's objectives and risk averseness. A sample hybrid utility function is illustrated in FIG. 11 (b).

The wide range of utility functions as well as the ability to run multiple optimizers with different utility functions gives the seller full coverage of the massive parameter space of all combinations of his or its objectives.

Target Allocation Using Qualitative Demand Curve

The target-directed implementation of FIGS. 14 and 15 also provides the seller with the ability to be time and demand sensitive in pursuing the target. In case of a retailer, at the start of a quarter, the seller is likely far away from the quarterly targets. This is expected and the seller need not be overly aggressive in pricing products. As time progresses, e.g., the end of the quarter nears, if the seller is still very far from the target, then it may be prudent to pursue the target more aggressively; i.e., the additional gain in winning the subsequent auction would be considered high. There are numerous other factors that are time dependent that affect the desired seller's utility. For example, the seller may have explicit sub-goals for the holiday season; the seller may be aware of changing buying patterns over weekends vs weekdays; there may be an upcoming event such as a super-bowl or a snow-storm; an advertising campaign that may lead to increased/decrease demand and thus require specific targets; in a 24×7 environment, the demand may be different during day vs night, and even during various hours of the day. A qualitative demand curve configuration can provide the seller with the ability to capture the varying relative demand over time and further enhances the effectiveness of the utility function. The seller is asked optionally to configure a qualitative demand curve for the target period. The seller's configuration could be based on a graphical display input; such as the sample qualitative demand curve for a weekly target illustrated in FIG. 12.

The demand curve provides a mechanism to measure and track the intermediate progress of the seller, as opposed to traditional techniques based on demand forecasting. In the figure, the demand gradually increases over the week and through day 6, while decreasing back down on day 7. The weekly target is then subdivided into daily targets based on the relative demand curve. This process may be further used to derive night/day or even hourly targets during which the demand is relatively uniform. Effectively, one can compute the area under the curve as a relative number and then appropriately map it to the quantitative sales targets for that specific duration.

The target-directed implementation finds the optimal price by maximizing the utility gain with respect to the distance to the target for the current sub-period. As time progresses from one sub-period to the next, the sales targets may be readjusted based on performance and seller configuration. If the seller does not achieve the weekly revenue targets for the first week of the month, for example, the remaining unmet target from the week may be rolled over in several ways, if so desired, such as to the next week, uniformly or non-uniformly distributed across the remaining week of the month, year etc. This is completely dependent on the seller configuration. If the seller chooses to distribute the unmet targets to the remaining sub-periods, the distance to the new (higher) target effectively increases thus making the optimizer more aggressive. As the end of the year approaches, all the unmet targets from before may be left to fulfill in the last month, if desired, resulting in potentially aggressively moving towards the target. The ability to use the demand curve to sub-divide targets provides intermediate check points, effectively minimizing of the seller's risk. If, however, the seller does not want to do this, all the unmet targets can be pushed to the end. The seller may also change the utility functions based on time to map against the demand curve. For example, they may choose to pursue the sub-targets less aggressively early in the quarter, while becoming more aggressive later in the quarter. Thus, by using the demand curve with target allocations, and weights, the target-directed approach can satisfy a wide variety of seller objectives.

Historic Bid-Response Functions

One of the parameters in the utility functions is $\rho(p)$, referred to herein as the historic bid-response function, characterizing the recent historic market behavior in terms of price and participants in the context of a real-time [ARTIST] environment. The historic bid-response function is used to select a nominal reference price while taking into account the price variations of recent vintage. Such reference price allows the optimizer to start closer to the current market conditions. The target-directed optimizer converges to the market price based on the goal of minimizing the distance to the targets, even if sufficient historical data is not available to compute a sufficient bid response function. While meaningful parameters for the historic bid-response function help faster convergence, they are not necessary for correctness.

The parameters of the historic bid-response function can be computed statistically by fitting a curve to the available auction historical data, based on minimizing the squared errors or using maximum-likelihood estimates as later described. Further enhancement can be made by more heavily weighing more recent historical data during the estimation.

The historic bid-response function parameters may be computed either at the SAEJ or at the RAC. RAC may provide a service to all the SAEJs by periodically transmitting the parameters of well-known and/or common historic bid-response functions. Individual SAEJs may use the given bid-response parameters or may use other bid-response curves by based on seller configuration and/or historical data gathered by the individual SAEJs.

As noted earlier, the historic bid-response function is used as a nominal proxy for the recent market behavior. It allows the implementation quickly to compute an optimal price close to the market price. In case the computed bid-response parameters are not available, or if the market price has deviated from the last computation of bid-response parameters, the distance to the target enables the implementation to converge to the true market price.

Two earlier mentioned common methods for computing bid-response parameters that are uniquely applied in this solution will now be described—minimizing squared errors, and maximum likelihood estimations.

Minimizing the Squared Errors

The historic bid-response parameters are estimated by minimizing the squares of the error terms from the bid-response curve to the actual wins and kisses of each auction opportunity within the historic window configured. For auction "I" the indicator variable $W_i$ is assigned the value of 1 if the auction is won, and $W_i$ is assigned the value of 0 if the auction is lost. Each auction i also has a weight $W_i$ which expresses the confidence in the accuracy or relevance of the point. Thus, to determine the best estimates of the parameter values, the bid-response should be as close to $W_i$ as possible. This can be achieved by solving the unconstrained optimization problem $$\underset{a,b,c,d}{\text{Minimize}} \sum_i w_i [\rho(p_i, Q_i, p_{ci} \mid a, b, c, d) - W_i]^2. \quad (16)$$

One statistic measuring the goodness-of-fit is the sum of squared errors (SSE) itself; that is, $$SSE = \sum_i w_i [\rho(p_i, Q_i, p_{ci}) - W_i]^2 \quad (17)$$

Maximum-Likelihood Estimation

This implementation for computing the bid-response parameter values involves choosing parameter values that closely mimic the pattern of wins and losses resembling the actual historic outcomes.

Assuming all auctions are independent, the probability of realizing the actual outcome for the auction based on a particular bid i is $$L_i(a,b,c,d) = W_i \rho(p_i, Q_i, p_{ci} \mid a,b,c,d) + (1-W_i)[1-\rho(p_i, Q_i, p_{ci} \mid a,b,c,d)] \quad (18)$$

The parameters, therefore, can be chosen in such a way that they maximize the probability of realizing the actual outcome over all observations. This can be achieved by solving the equation $$\underset{a,b,c,d}{\text{Maximize}} \prod_i L_i(a, b, c, d). \quad (19)$$

Further enhancement is made to the above embodiment based on natural logarithms of the likelihood, by solving the equation $$\underset{a,b,c,d}{\text{Maximize}} \sum_i \ln[L_i(a, b, c, d)] \quad (20)$$

It is now in order to return to the previously discussed exemplary implementation of FIGS. 14 and 15.
The Logit Bid-Request Function In the preferred embodiment of the invention, the ideal bid-response function, indeed, is the Logit function due to its unique characteristics. The general form of the Logit function is:

$$\rho(p) = \frac{1}{1 + e^{a+bp+cQ+dp_c}}, \quad (15)$$

where
p Unit price quoted by the seller.
ρ(p) Historic bid-response function at price p
Q Order size (number of units)
$p_c$ Recent historic average unit price in the market,
and where a, b, c, d are scaling parameters for the Logit function. These parameters are used to measure the effects of various factors:
 a Parameter related to non-price factors
 b parameter related to price factors
 c Parameter for the order size
 d Parameter for the recent historic average market price
A typical Logit bid-response function is shown in FIG. 12.
Variants of the above Logit function and other functions can also be used such as:
 Power function:

$$\rho(p) = \frac{\alpha}{\alpha + rp^\gamma}$$

Gompertz function: ρ(p)=a+c exp(−exp(−b(p−d)))
Von-Bertalanffy function: ρ(p)=(a^b−(a^b−c)e^{−bd(p−p_0)})^{1/b}
Janoschek function: ρ(p)=1−exp(−bp^c)
Exemplary Target-Directed Implementation
(FIGS. 14 & 15)

A Typical Flowchart Implementation for the Illustrative Sales Target-directed implementation of FIGS. 14 and 15 follows:

Flow Chart For FIGS. 14 and 15

1. Initialization
   Set utility weights based on seller configuration at 32, FIG. 14.
   Choose utility function at 30 and aggressiveness factors based on seller configuration.
   Set the seller configured sales targets and duration of the targets at 31.
   Use seller-configured qualitative demand curve created as shown in FIG. 13 to divide the target period into T sub-periods at 31D in FIG. 14.
   Allocate targets to sub-periods at 31E, in proportion to such sub-period demands.

2. Repeat for Each Sub-Period
   Repeat for each RFB for a new auction (as configured by seller)
   Set historic bid-response function parameters at 40, FIG. 15, if updated values are available from RAC (41) or local computation
   Compute at 42 achieved revenue, profit and sales volume so far
   Compute expected utility at 43 with this request against targets for this sub-period
   Compute the optimal price at 44 by maximizing the expected utility and return the optimal price at 45.
3. At the end of each sub-period, automatically readjust targets for the remaining sub-periods, basing on the over or under achievements in this period, subject to seller configuration.

It may be noted that, as with the rules-engine implementation of exemplary FIG. 7, above, presented, this implementation does not impose any restrictions on the price that is returned to the RAC. The price is returned via the integrator which may be configured in several ways such as, the following.

For RFB, the optimizer is invoked at the start of every new auction, and the price resulting from the optimizer computation, can be used as a temporary computed optimized floor (in case of the retail vertical) for the next bidding rounds in the same auction. This is an optimized sub-constraint clearly residing within the overall constraints configured by the seller. In this case, the integrator starts with a configured (or computed) ceiling price and iteratively drops the price to the temporary computed optimized floor or until the auction ends (whichever comes first). For RFQ, the options are simpler such as return the list price configured by the seller or return the optimal price at 45 as computed by the optimizer.

It should be understood that these are just exemplary embodiments of how the combination of optimizers and integrators can be used for quotes and auctions. There are, of course, numerous other embodiments based on the fundamental innovation of this invention in its seller automated engine computing prices/bids in real-time and based on a seller's widely varying set of objectives.

This sales target-directed implementation, however, makes two assumptions:
1. For faster convergence, typically, recent historic data over a desirable time interval or desirable number of auctions is used to generate a bid-response function. Further filters could be applied such as seller class, time of day etc to further refine this data based on seller's requirements, and
2. For tracking a sellers intermediate progress based on demand, the qualitative demand curve of FIG. 12 is configured by the seller so that the target can be broken into sub-periods. The objective here is not to have the actual quantitative charts with time, but rather a qualitative positioning with respect to time. As an example, it may be desirable to know if a product such as a camera is sold more on Friday, Saturday, and Sunday in relationship to other weekdays. On the other hand, a bank CD may be more likely to be transacted during weekdays than over the weekend. As discussed earlier, the qualitative demand curve can be obtained from seller input or from historical data.

Such inputs for implementation may include:
1. Seller's targets such as revenue, profit and sales volume targets for each product. The targets may be quarterly, monthly, weekly or daily, or any other interval selected by the seller. In the example of sales targets, revenue and profit are in monetary units, and sales volume is the number of product units the seller expects to sell.
2. Bid-response parameters (for a reference market price for faster convergence). The bid-response parameters can be sent to the SAEJ by the RAC, or computed by SAEJ as described earlier.
3. Qualitative demand curves for each product for tracking progress can be configured or extracted from historical buyer activities as described earlier, particularly where only relative demand is needed.
4. Seller's utility function (or functions if multiple chosen) and associated utility parameters, including aggressiveness factors, as configured by the seller.
5. Relative utility weights. Relative importance of revenue, profit and sales volume to the seller. The weights are real numbers between 0 and 1, and they should sum to one.
6. Product unit cost.
7. Appropriate price constraints. The lower limit of the price could be the cost in case of a camera; on the other hand in case of a bank CD, upper limit on interest is the constraining issue rather than the lower limit.

As described earlier, furthermore, the target directed implementation is well suited for the sales target optimizer where the seller is trying to achieve annual, quarterly, monthly etc, targets. The target intervals can also overlap with two optimizers operating over the desired time periods and with appropriate targets, respectively. The target-directed implementation can also be used for events price optimization. In this case, the seller may want to boost sales during a week/weekend or any arbitrary time interval. The seller configures the optimizer with the appropriate targets, duration, weights etc, and the optimizer computes an optimal price from the targets. The integrator then decides which price (or a new price resulting from integrating the several optimal prices) to use.

Another example of effective use of this implementation is for supply break optimizations. As described earlier, the seller can specify the supply break information, and these form the targets entered into the supplier break optimizer 11. When the number of items sold so far is sufficiently close to the supply break (as specified by the seller), the supply break optimizer is triggered and processes requests until the supply break is met or the supply break time expires (whichever comes first). The price integrator PI then uses the results of the individual optimizers, along with appropriate constraints on pricing, and other input from the seller, and then generates the bid price at 7 to be returned to the RAC.

As may be evident from the above discussion, the target-directed implementation has several key advantages that enables its use for a variety of optimization purposes, with the ability to adapt to a wide range of evolving market conditions and seller objectives. Some of these advantages are.
1. It is target-directed and significantly enhances, in real-time and in an automated fashion, the offline and heretofore manual, cumbersome sales process of many organizations. This results in efficiency improvement of several orders of magnitude
2. It allows the seller to set sales targets (using revenue, profit, sales volume and other similar metrics) and optimally, in real-time, manage product pricing to maximize the likelihood of reaching the targets in ever-changing market conditions.
3. Multiple independent targets can also be set. For example, in case of CDs, a bank may set deposit goals of $10 million, 3 months duration at lending rate of 8%, spread of 3% to be raised in 5 days, and $20 million, 6 months duration at 8.5% lending rate, spread of 2.5% to be raised in 4 days, etc. The implementation may be used by independent and/or dependent and/or any combination to achieve all of the targets simultaneously.
4. Can be used by multiple (similar or different types) optimizers such as sales target optimizers, supply break optimizers, event optimizers etc, each of which is tailored to seller objectives, thus enabling the seller to achieve a large variety of objectives.
5. Both independent and dependent targets can be set.
6. This approach maximizes a weighted combination of multiple targets enabling the seller to make trade-offs among different targets in real-time on a dynamic basis. This is unlike traditional systems where such processing consists of highly inefficient manual processes.
7. Seller has numerous utility function options to choose from to meet its unique objectives.
8. By assigning desired weights to the sales volume target, the seller can manage inventory efficiently.
9. By assigning desired weights to the revenue target, the seller can manage revenue efficiently.
10. By assigning desired weights to the profit target, the seller can manage profit efficiently.
11. No prediction of future demand is required at all.

Exemplary Market Share-Directed Implementation (FIG. 16)

The market share-directed implementation of the invention previously described computes price by considering the percentage of the auctions won (market share) in the previous pre-defined number of requests. As an example, consider that 10 auctions were won out of 100 requests received. This could be computed as a unique number per so many requests received for example in a slot of 100 auctions, or could be a rolling number such as number of auctions won in last 100 auctions. If the market share is below the desired target, the price will be appropriately corrected automatically and in real-time until the desired objective is matched. If the number of auctions won is higher than the desired market share, the machine will automatically make appropriate corrections using this feedback loop to cut the winning percentage down, if so desired by the seller (or vice versa). The key idea is to make the winning independent of the time of the day, or day of the week, or if it was a snow day, etc, and ensure that the winning percentage number effectively adjusts itself as per the market demand without requiring any quantitative forecast.

A typical implementation is given below, and illustrated in FIG. 16, though there are a number of variations that may be chosen to implement such, including rolling computation of the market share.

Flow Chart for FIG. 16

1. Initialization

Set initial price at 31 (could be either based on seller configuration or based on pre-specified criteria on historic market price).

Set market share target as configured by the seller at 30.

Set scaling factor as configured by seller at 32. The scaling factor determines how aggressively the seller wants to pursue the market share target.

2. Repeat after every N requests

| | |
|---|---|
| a. | Track and compute market share for these N requests at 34. |
| b. | Compute absolute "distance" between achieved and target market share at 35. |
| c. | IF market share < target, |
| |    set new price = old price−scaling factor *distance, at 37. |
| | Otherwise, |
| |    set new price = old price + scaling factor*distance, at 38. |
| | END |
| d. | Set the new price as the price for next N requests at T3. |

As with the target-directed implementation, previously discussed, the result of this market-share-directed implementation may be used in a variety of ways.

This market-share-directed implementation makes no assumptions about the demand, buyer and competitor characteristics. The key input is the target market share. In addition, the product cost and the appropriate constraints on the unit price are also required inputs. One additional feature provided by the RAC is the ability to provide a constraint in terms of not to exceed a configured market share, thus enabling liquidity. The RAC market share will override the seller-configured market share in case the latter exceeds the former. As an example, the RAC could constrain any one entity to no more than 25% market share.

There are several advantages for this market-share implementation:

1. It allows the seller to track and respond to the changing market conditions rapidly.
2. The implementation is independent of time, and entirely a function of market demand within a pre-specified interval used as a measure (eg. annualized market share). This can be further subdivided (eg. on a quarterly basis) with its own unique market-share target. This will provide the ability to the seller to have quarterly targets in addition to an annualized blended target. As an example, if it is a holiday and not much trade is being conducted, the demand on a bank CD is likely to be lower; and as those requests slowly arrive, the system will respond in a measured manner attempting to win a certain percentage of auctions regardless of the slowness of the request arrivals.
3. It helps the seller maintain, increase or decrease market share automatically and in real-time, in a highly competitive environment.
4. Ability to keep pace with the market automatically if demand slows down or speeds up.
5. Independent of other competitor's promotions etc if so desired.
6. Ability to diversify and always participate in the market, thus reducing the risk of tactical decisions adversely affecting the goal in a significant manner.
7. Persistence of price promotion and price avoidance are schematically represented as time cycles in FIG. 17. For a retail vertical, generally a seller does not want to establish a product price any lower than necessary in a fiercely competitive environment. In circumstances such as supplier's break or aggressive inventory reduction where the seller may have to dip a bit lower to meet the targets; it may be highly desirable to act in a manner which minimizes the persistence of such reduced price. As an example, if a seller found a new viable price at which it can sell 100 cameras, it may try to win 100 consecutive auctions and deal with the resulting likelihood of a residual price persistence. That is, for one auction, the price is lowered and the auction is won. Then, subsequently, the price is raised for some further auctions. To avoid a low persistent market price, a duty cycle of periodic price raisings may be instituted as shown at "Price persistence avoidance during promotion", FIG. 17. Thus, the same function can be executed with a duty cycle of, for example, 10%, implying winning 1 out of 10 auctions. This will result in a stretched number of auctions across which 100 cameras were sold, but, the price persistence is now minimized. This can be implemented in a number of different ways. One way is to use the Integrator to put on the brakes such that it does not try to win any auctions for 'N' number of slots after winning 'M', generating the desired duty cycle conceptually shown in FIG. 17. Both 'N' and 'M' are seller configurable.

Exemplary Utility Derivative-Following Implementation (FIG. 18)

The utility derivative-following implementation, as the name suggests, is based on improving the seller's utility over time. In the utility derivative—following approach, in the preferred embodiment, the utility can be formulated as a function of distance to the target as previously described in the target—directed implementation. In alternative embodiments, any other utility function may be used as desired by the seller.

The utility derivative-following implementation, however, compares the utility gained (or lost) from change in price over two previous intervals. It then adjusts its price by looking at the amount of utility earned on the previous interval as a result of the previous interval price change. If the price change produced a higher utility, then the strategy makes a similar change in price for the next period. If the previous change produced lower utility, then the strategy makes an opposing price change for the next period. If the utility is target based, this approach will try to follow the market and pursue the targets simultaneously.

A typical implementation is shown below and illustrated in FIG. 18.

Flow Chart For FIG. 18

1. Initialization

Set initial price at 31. This initial price could be configured by the seller based on his understanding of the market price, or it may also be obtained from historical data if available.

Set initial utility at 39. The initial utility is calculated based on the seller's configured desired utility function. In case of a target based utility function, the calculation is based on the distance to the target.

2. Repeat after every N requests. (The initial price is fixed at 40 for N requests, where N is configured by the seller). After every N requests at T4, the utility gain/loss is computed and the price is adjusted based on this.

---

Track and compute utility gain at 41 for these N requests.
IF utility gain > utility gain of previous N requests and
   IF current price > previous price, THEN
      add a positive random amount within constraints to
      the current price (This amount could be pre-
      specified by the seller or computed as a small
      fraction of the current price)

```
            Otherwise,
                subtract a positive random amount at 43 within
                    constraints from the current price
            END
    IF utility gain < utility gain of previous N requests,
THEN
        IF current price > previous (old) price,
            subtract a random positive amount at 43 within
                constraints from the current price
        Otherwise,
            add a random positive amount at 42 within
                constraints to the current price
Set the newly computed price at T4 as the price for the next N requests.
```

The inputs for this implementation are:

Initial price as described in the implementation. The closer the initial price is to the market price, the quicker the implementation converges.

Revenue, profit and sales volume targets, if using a utility based on these targets. As noted before, any utility can be used.

Seller's utility function and associated parameters.

Utility weights.

Product unit cost

Appropriate constraints on unit price

Since the price changes in this implementation are based on utility, and the utility is related to the specified targets, the implementation can be also considered as target-directed, but with a few further unique advantages.

1. It further reduces computation by not requiring historic bid-response; and
2. It is responsive to the changing market conditions while working toward to the preset targets.

Exemplary Model Optimizer with Exploration Implementation

This implementation has some similar properties to the target-directed implementation before described. It uses the concept of maximizing utility to compute an optimal price for initial use. This is called the "baseline optimal price". It further improves this baseline optimal price by using random (within constraints) deviations from the baseline optimal price to periodically explore the price space. Once a more optimal price is found, the implementation uses that as the baseline optimal price until an even more optimal price is found. This process continues as the system continues to hunt for the optimal price in an ever changing marketplace. The deviations from the baseline optimal could in fact be related to the distance to the target, or any other number as desired by the seller. The ability to explore the price space by using deviations from the baseline optimal price allows the seller to lead the market where a more optimal price is found.

A typical implementation is described in the flowchart below and is illustrated in FIGS. 19 and 20.

Flow Chart for FIGS. 19 and 20

1. Initialization
    Set parameters for bid-response function.
    Decide at 20 on the utility function to use, and set utility parameters.
    Set relative weights for utilities at 50 in FIG. 19.
2. Repeat after every N requests (52)
    Set at 61, FIG. 20, historic bid-response function parameters if updated values are available from RAC or local computation
    Compute optimal price based on maximizing utility and set this as the "baseline optimal price" for the next new auction requests.
    As requests for new auctions are received, return the "baseline optimal price above", unless this is the random request is chosen for the exploration experiment whose duration is M requests.
    If current request is the random request chosen for exploration experiment
        Compute the distance to the target at 62, FIG. 20, based on the utility function desired.
        For this request, adjust the price up or down randomly at 63 (within constraints) by an amount proportional to the distance. Call this the "experimental optimal price" (EOP), for use for next M requests
    After M requests, re-compute utility at 64.
    If the average utility gain per request using the experimental price EOP after M requests is more than the average utility gain per request, using the baseline optimal price, use the experimental optimal price EOP as the new baseline optimal price at 65 and T7.
    Otherwise, keep the baseline optimal price unchanged.
Further process requests from the RAC are processed at 59 and the optimal price is returned at 85.

This implementation for FIGS. 19 and 20 makes assumptions similar to the before-described target-directed implementation, as follows:

Historic bid-response function parameters for faster convergence.

Revenue, profit and sales volume targets.

Seller's utility function and associated parameters.

Utility weights.

Product unit cost

Appropriate constraints on price

This implementation being utility based and the utility being related to the targets, it is also thus target-directed, permitting the seller to have the ability to lead the market by setting the product price by using random deviations up or down from the baseline price. The implementation can be further enhanced, moreover, by using machine learning techniques that provide intelligent ways of picking when to experiment; how much to raise/lower the price, and for how long.

Useful Applications of the Invention

While it is clear from the above discussions that the SAEJ of the invention can satisfy the various and ever-changing objectives of sellers in a wide range of verticals, the SAEJ architecture provides the additional ability to the seller of enabling quantitative optimization of prices based on more complex dependent and independent objectives, in turn involving one or more verticals. With prior art or existing non-SAEJ based technology relying on manual or off-line processing, it is not possible to optimize in real-time and iteratively, thus limiting the scope of applications to silos of a small set of individual products, or verticals using manual or batch processing.

It is now in order to describe some of the most useful applications of the SAEJ of the invention that not only reinforce its applicability for a wide range of verticals, but also describe how this architecture provides the ability to optimize across multiple verticals, thereby allowing the seller to achieve overall objectives globally across all the desired verticals.

As earlier mentioned, moreover, the banking community as an example of an industry that can particularly benefit from the adoption of the techniques of the invention.

All the previously described pricing implementations of the invention for the retail industry, indeed, can also directly be applied to the bank deposit and loan vertical.

Banking Certificates of Deposits

Banks rely on consumer deposits (in the form of CDs, High Yield Savings, Checking etc) as a source of funds for their loan commitments. They offer CD products with various maturities—as 3 months, 6 months, 9 months, 1 year, etc. In the case of CDs, they generate profit from the difference (spread) between interest payments on CDs (calculated as the annual percentage yield or APY) and the interest earned on loans.

One of the key challenges for banks is to collect sufficient CD deposits of appropriate terms and within appropriate timeframes so that they can meet their corresponding loan commitments. Banks must also determine the APY offered for each CD product based on various factors, such as short term and long term interest rates, loan commitments, market rates for comparable CDs, required spread to support overhead and other financial market conditions. Currently, the deposit needs are calculated manually and in an ad-hoc manner based on current loan commitments. In addition, banks have no means to use higher APYs (equivalent to lowering the price in retail) to attract requisite consumer deposits within a short time-frame, without significant advertising spending. These solutions require significant advanced planning and preparation, and as a result are unable to respond to needs in real-time as they arise.

The SAEJ architecture and implementations described herein, however, can easily be applied to bank CDs where SAEJ calculates, in real-time, the optimal APY for each CD product based on bank objectives, and market conditions. In a preferred embodiment, the before-described target-directed implementation may be used; but in alternate embodiments, the market-share implementation, the rules-based implementation, the utility derivative-following implementation, the model optimizer with exploration implementation, or a combination of these implementations may also be used.

As before stated the objectives of the bank in meeting loan commitments and achieving profitability etc, can be mapped into quantitative targets for the price optimizers techniques of the invention.

Loan commitments can be used to specify deposit targets. For example, if the bank has a loan commitment for $10 m for 1 year, it must collect the loan amount in the form of deposits (or borrow from other institutions such as FHLB, which is a less desirable option due to strict regulations, expensive rates and collateral requirements) so that sufficient funds are available in time to fund the loan for its term. These loan commitments can be used to specify deposit "targets" for the corresponding CD products (of appropriate term), and the deposit targets must be fulfilled within a pre-specified time.

Profit targets specified by the bank are a function of the blended average spread between lending rate (or a specified number of points above a benchmark rate) and interest paid on deposits. Profit "P" can be defined as a function of $A(r_L - r_A)$, where A is the amount deposited, $r_A$ is the interest rate that the bank pays to the consumer, and $r_L$ is the interest rate the bank earns by lending or investing the same amount of money. This profit target can be configured by the seller over a pre-specified time interval.

Thus, for each CD product, the bank configures deposit targets. For each deposit target the following factors are involved:
  a. Time to fulfill the deposit target. This may be defined as the time when the target deposit is needed by the bank.
  b. The duration of deposit is specified with the CD product selection
  c. Profit target.
  d. Appropriate constraints on APY
  e. Bank lending interest rate (or a reference rate).
  f. Bank utility function and relative weights.

For each RFB for a new auction, the following steps are involved:
  1. The price optimizer (PO) computes the optimal APY, referred to as the optimal computed APY. The optimal computed APY can be used as the temporary ceiling for the remaining auction rounds.
  2. The price integrator (PI) starts with a floor APY (which may be configured by the seller as part of constraints on APY, or be chosen to be a low number within such constraints), and then increments the APY subject to other bids, iteratively in successive round bids, until it wins the auction or reaches the optimal computed APY, whichever comes first. The increment size may be constant (for example, subject to highest bid in the last round), or proportional to the weighted "distance" to targets. The further away the bid from the target, the incremental size will be larger; closer to the target, the size will be smaller. The size can also be inversely proportional to the remaining fulfillment time. In addition, the number of iterations for the auction may be imposed from the controller. The distance to the target may be linear, exponential, piecewise linear, piecewise exponential or hybrid as described herein.

It should be noted that multiple such targets can be configured. A bank, for example, could have a need to raise $10M in deposits in the next 24 hours, under terms of a one year duration, a lending rate of 8.5% with a minimum spread of 3%. Other such targets (also called "buckets") might be a desire to raise $3M in the next 3 days, with a 6 month duration, for a lending rate of 8% and with a minimum spread of 2.75%. Both these and other such requests can be set-up simultaneously. Each of these targets furthermore, can also be prioritized or a relative weight assigned thereto, if so desired, enabling each new request to be responded to with corresponding aggressiveness subject to the current status of the target. This is in sharp contrast to the prevailing manual practice at banks to speculate and then set the interest rate (and invariably overshoot or undershoot), advertise for much longer duration, and wait for the response. The resulting uncertainty and advertising expenditure in such a process is undesirable. In the mean-time, a mutual commitment cannot be made to the customer, resulting in very little stickiness of associated business.

The Bank Credit Card Problem

Banks issuing credit cards prefer subscribers with specific types of credit scores. Some banks aim for those customers with stellar or fairly decent credit scores. Others prefer sub-prime credits scores; and still others opt for everyone in between. Each strategy has its advantages and disadvantages.

While a portfolio of best credit score subscribers is very safe, the return tends to be low as most such subscribers pay their bills on time, leaving little opportunity for the bank to earn interest and fees. On the other hand, sub-prime subscribers are high risk due to high default rates but they may provide a much higher rate of return. Ideally, banks like to have a portfolio which minimizes the credit risk yet provides a decent rate of return over economic cycles of different hues. Unfortunately, however, their manual process forces them typically to evaluate the portfolio at the end of each time interval (as an example, a quarter), and then estimate the blended credit score across the entire portfolio and the blended interest rate. Not only is this information too late and after the fact, their inability to correct the situation in the short run or to the requisite precision compounds the problem.

Such a problem admirably lends itself for solution, to the use of multiple engines of the invention, one for each desired category of credit score, and an optimizer dedicated to perform front end arbitration and optimization in order to select a specific engine to participate in the subsequent auction.

Consider, as an example, a bank wanting to offer credit cards to subscribers with 4 different categories of credit scores under circumstances of an illustrative total line of credit targets as shown below, with the intent to maintain a blended credit score across all the targets of between 600 and 700 at any point in time, as shown in FIG. 21. In this illustration, there is shown:

For credit score>800, the total target credit line amount is $50M

For 700<Credit score≦800, the total target credit line amount is $100M

For 600<Credit score≦700, the total target credit line amount is $200M

For 500<Credit score≦600, the total target credit line amount is $100M

For 400<Credit score≦500, the total target credit line amount is $50M

In this case, the PMU 4 consists of a front-end optimizer PO at 80, as well as several SAEJ credit-optimizers (SAEJ1 through SAEJ5), one for each target specified by the seller.

As each request for a new auction arrives, the front-end optimizer 80 examines its credit score in real-time to ensure that it is within the acceptable range (above 400 in this case). Assuming the request is within the range, the optimizer uses the following computation to determine the incremental blended average, if this auction is to be won.

The blended credit score is calculated as $$C = \frac{\sum_{i=1}^{N} F_i C_i}{\sum_{i=1}^{N} F_i}, \quad (21)$$

where, in the above formula, C is the blended credit score and $C_i$ is the average credit score for target i. $F_i$ is the amount of credit issued so far for target i, and N is the total number of targets.

If the computed blended credit score is expected to remain within the constraints outlined by the bank, the front-end optimizer signals the corresponding credit-optimizer to participate in the bid process. Alternatively, if the blended average constraints are going to be violated, the front-end optimizer will not signal any credit-optimizer to participate in the bid process. Thus, this optimization across various targets, in real-time and on a dynamic basis, guarantees the bank all the time a consistent blended credit score (CS) quality of its entire credit card portfolio at any time. The bank, furthermore, also has provided for the blended interest rate per line of credit target and across the portfolio—all available at the same time.

This is illustrated in FIG. 22 where again as in FIG. 21, multiple SAEJ optimizers (1 through 5) are employed to achieve the blended credit score (CS).

Beyond the blended credit score optimization across the portfolio outlined above, in an alternate embodiment, each SAEJ engine may also optimize its blended interest rate to the bank-specified level, using any of the techniques discussed herein. In this scenario, the bank will have the guarantee of a portfolio optimized for not only specific blended credit scores; but also further optimized to a desired interest rate level for each total credit—line target.

This same concept can also be applied to auto loans and other verticals in financial and similar situations.

Optimized Bank Deposits and Dependent Optimized Loans

Another feature in using the techniques of the present invention, again using the bank vertical as an example, and which was not previously feasible, is herein also enabled. Consider a case in which a bank has set-up and configured multiple optimizers to collect deposits, such that a first is dedicated for 3-month deposits as at $1^1$ in FIG. 23, a second at $2^1$ for 6 months, a third at $3^1$ for 1 year, and a fourth at $4^1$ for 2 years and above. Each type of deposit has its own hard constraint on the interest rate to be paid for such deposits such as shown at $1^{11}$, $2^{11}$ and $3^{11}$, respectively. In addition, each one may have a weighted blended interest rate target computed such that, for example, an illustrative $10,000 at 5.25% carries twice as much weight as $5,000 at 5%, when computing the average.

As another important application of the invention, consider that a bank has also adopted and set up the multiple optimizers of the invention for auto loans, categorized, for example, according to the applicants credit scores that it is to process, each, however, subject to its own unique constraints and targets, such as blended interest rate, and spread with respect to some standard benchmark such as Treasury or LIBOR or others. A blended credit-score target can be achieved across these auto loan optimizer-engines $1^{11}$, $2^{11}$ and $3^{11}$, and the same for blended interest rates.

In this situation, a price integrator PI of the invention may readily be used, as in FIG. 23. The integrator connects the above-described deposit engines $1^1$ through $4^1$ to the front-end optimizer, so-labeled. The over all system may have the following illustrative constraints, with the loans being made only from the deposits collected.

The aggregate percentage contribution from each deposit engine towards loans, however, may be different—auto loans, for example, tend to be for longer terms. The bank could, as an example, specify that deposits are to be disbursed such that 94% of the deposits collected by the 2-year plus engine $4^1$, are to be used towards such auto loans; 50% for the 1-year deposits $3^1$; 10%, for the 6-months $2^1$; and 5% for 3 months $1^1$, and so on.

Deposits, furthermore, may be collected by bidding in real-time for prospective depositors according to configured constraints. These deposits may then be funneled, appropriately proportioned, via the integrator to the front-end optimizer of the loan engines. As a request for an auto loan arrives, the front-end optimizer examines its credit score in real-time to ensure that it is within the acceptable range. Assuming the request is within such range, the optimizer uses the following equation to determine the incremental blended credit score average across the portfolio, if this auction is won. The blended credit score is calculated as $$C = \frac{\sum_{i=1}^{N} F_i C_i}{\sum_{i=1}^{N} F_i}, \quad (22)$$

where C is the blended credit score and Ci is the blended credit score for engine i; Fi is the amount of loan issued so far for engine i; and N is the total number of loan engines.

If the computed blended credit score is expected to remain within the constraints outlined by the bank, the front-end optimizer signals the matching loan engine to participate in the auction, assuming funds are available. Alternatively, if the blended credit score constraint is going to be violated, this optimizer will not signal any loan engine to participate in the bid process. The selected loan engine then participates in the auction with its unique constraints and targets as configured by the bank. Thus, not only are each engine targets optimized, but blended targets across various engines are also optimized and in real-time and on a dynamic basis. This guarantees the bank a consistent blended credit score quality across its entire auto loan portfolio at any time, all the time. Furthermore, the resulting blended interest rate across such loan engines can also be computed, providing additional insight into the loan quality. Additionally, the front end optimizer also optimizes for the blended portfolio interest rate by computing in real-time the allowable lower limit interest rate constraint as each loan auction request arrives. This dynamically computed allowable constraint is then automatically provided to the selected engine.

As is evident from FIG. 23, moreover, this implementation provides a powerful mechanism for banks to collect deposits in real-time and subsequently to make auto loans in real-time while maintaining the appropriate constraints on both deposits and on loans, such that not only is the deposit base substantially expanded, but the corresponding loan business is appropriately matched—all the while maintaining an optimized loan quality both at in individual engine level and also across the entire loan portfolio. This architectural configuration using implementations described earlier can provide banks with an unprecedented opportunity to grow in a very short time. Clearly, moreover, many variations of this concept, adjusted for vertical specific parameters, can be used in various verticals.

While the important application of the technique of the invention to banking services has been stressed, application to other services and goods bring similar advantages that will now be summarily tabulated.

Summary of the Unique Advantages of the SAEJ Solution of the Invention

- Provides the ability to sellers simultaneously to process in real-time, a number of multiple interacting variables such as revenue, profit, market share, inventory, supplier-break, competitor events, market demand changes and others, and automatically to optimize, in a dynamically changing environment, and make iterative bids within specified constraints in real-time on demand—all without the need for manually tracking the variables.
- Once configured, requires no manual intervention from the seller (unless the seller so desires), even in the presence of dynamically changing market conditions.
- Supports multiple instances of multiple types of price optimizers that can be configured based on the sends objectives as well as market conditions, demand, competitive behavior, inventory, supplier-break etc. The price optimizers compute when to update the price and by how much, based on real-time data from the marketplace and seller configured parameters, and without requiring any further manual intervention from the seller.
- Ability to set sales targets (using revenue, profit, sales volume and other similar metrics) for pre-determined time frames such as daily, weekly, monthly, quarterly, annually and so on. Furthermore, optimized product pricing is derived in real-time to reach the targets. The need to speculate the price that the market will bear is also eliminated.
- If a target is missed, the ability is provided to allocate the missed target in several ways, as desired, such as:
  move the difference to the immediate next time slot;
  distribute it equally over multiple times slots;
  distribute it unequally across multiple time slots to match the customer buying pattern, and so on
- Ability to adapt to dynamic interplay among sales targets and provide requisite respective emphasis to each sales target, and correspondingly compute an optimum price.
- Ability to select, among nearly infinite choices of rates of approaches to the targets, an approach unique to the seller's objectives, such as:
  make all out effort early in the quarter to minimize any risk of missing the quarter;
  pace slowly initially and pick up momentum as it get closer to the quarter;
  sell at a steady pace, participating in the market price variations throughout the specific duration resulting in improved diversification;
  Any combination of these choices can also be selected as a piecewise function.
- If the sales target is met earlier in the desired interval than anticipated, ability to choose from multiple approaches such as slow down to keep the revenue smooth and predictable; be more aggressive for the rest of the interval; accelerate to substantially enhance the profit as the overheads largely remain the same; and any combination of the above in the form of a piecewise function.
- Ability to specify market-share target, and, dynamically, in real-time, maintain, increase or decrease market share in a highly competitive environment, without any manual or off-line processing. This makes the process independent of demand as a function of time, and provides the ability to manage growth and resulting market share in numerous ways, including, grow at a pace faster than market, to gain minimum sufficient volume critical to their survivability, or to be a major player, or due to near-term equity valuation considerations, or combinations thereof; or to grow at market pace or higher so as not to allow the competitors an edge; grow only at the market pace, possibly due to various constraints including lack of growth capital, supply of raw material, lack of trained manpower, or the fear of inviting an anti-trust ruling
- Ability to discover and implement in real-time an optimizer strategy subject to the current distance to the respective targets, and/or unique constraints and time left in the specified duration. This can lead to a sacrifice of profit in favor of revenue, or vice-versa; or the sacrifice of both profit and revenue in order to reduce the inventory rapidly at the tail end of the useful life, especially those of seasonal products; or to a sacrifice of some targets for the desired market share
- Ability to achieve quickly a volume-based discount from its suppliers/manufacturers automatically and in real-time without requiring any manual intervention. When a seller is close to meeting a supplier-break target the ability is provided to automatically accelerate the product sales by running a very short term promotion in order to reach the target and acquire the much larger retroactive or proactive profit, or both.

Ability to run promotions independently of, and/or in anticipation of, competitive promotions in real-time and with the:
  Ability to automatically track competitor promotions based on current market price, for hundreds or thousands of sellers in an on-line fashion;
  Ability instantaneously to respond to competitor promotions, if so desired, without any manual intervention;
  Ability to select which promotions for response based on seller class, geographical location etc.; and
  Ability to do all of the above without any manual intervention when a competitor promotion does occur.

Ability to maintain and track those consumer and reseller desires to purchase products at certain price points determined by them, and offer such prices to this captive market that is willing to purchase at these price points without being forced to advertise such prices to entities outside of the target customers, such as competitors or other customers, and without requiring the customers to register on a seller specific system, such as the seller's web site. This seller offering is made on a real-time basis and is an exceptional tool to enable sellers to generate very short promotions, without significantly alerting the market space. (Traditional mechanisms are ineffectual under these scenarios).

The price optimizer together with the Integrator of the invention allows the seller to achieve all of the above goals automatically and simultaneously. This is accomplished by adjusting the priority/weightage of each goal based on prevailing market conditions and the time left to meet the time-sensitive targets as compared to the overall duration and the current distance to the other targets. For certain market conditions or time periods in the sales cycle such as towards beginning of the quarter for example, profit may be more important than revenue; while near middle of the sales quarter, meeting a revenue target may be much more important than profit, and near the end, inventory reduction may have higher priority than either profit or revenue, as per the seller's objectives.

Optimizers along with the Integrator herein allow the seller to achieve all of the above goals simultaneously and in real-time without manual intervention; each time the price has to be adjusted to achieve the goals in the presence of dynamically changing market conditions.

The optimizer accomplishes the above goals simultaneously in real-time, moreover, without waiting for offline tools to gather market data and adjust pricing over a period such as a week or month or more.

The optimizers achieve all of the above goals simultaneously, furthermore, without being required to predict future market conditions. Only qualitative input is required for the demand curve, and if this is not available, the market-share optimizer is used.

By constant interaction with the auction/reverse-auction controller, and by generating real-time responses, the system achieves all of the above goals simultaneously, through dynamically updating the offered pricing in real-time to the benefit of the seller, based on its own unique objectives.

For sellers such as banks, the ability is provided to specify deposit requirements in the context of lending rates, spread, duration, and blended average deposit rates, and the optimizers of the invention will optimize the associated set of variables in real-time.

Sellers such as credit card issuers, moreover, have the ability to specify engines of desired credit score ranges and corresponding credit limits and interest rate ranges, as well as a blended credit score and blended interest rate, and issue credit cards while continuously maintaining all these constraints in real time without any manual or off-line processing.

The sellers of such, additionally have the ability to carve out deposit requirements with different constraints, as multiple engines optimize for each one in real-time, and they also simultaneously optimize across them in real-time if so desired. This same concept also applies to other exemplary areas such as credit card engines, each supporting a different range of credit scores etc.

Ability to specify a set of engines to collect deposits and then enable the usage of the proceeds, in part or in whole, by a set of dependent engines focused on credit card verticals or auto loan verticals or both, each such set and their respective subsets being allowed to have unique constraints and targets, such as a desirable range of credit score, blended credit score of the portfolio, and blended interest rate of the portfolio etc.

While the automatic price optimizers, price integrators and SAEJ engines Containing the same, as well as the underlying mathematical basis, have heretofore been described for use in automatic reverse auction applications, they are of broader utility wherever automatic price optimization calculations may be desired. Such other applications, indeed, may involve manual set-up as, for example, particularly in banking, financial, insurance and related applications.

Further modifications will occur to those skilled in this art and such are considered to fall within the spirit and scope of the invention as defined in the appended claims.

What is claimed is:

1. An automatic price quotation system comprising, in combination:
  a seller automatic engine storing or receiving seller-specific business objectives, historic market data, and current market condition information and responsive to requests to create a price quotation based upon the request and within the respective guidelines of seller-specific predetermined information stored in the seller automatic engine;
  one or more price integrators within the seller automatic engine adapted to process at least two price optimizers configured for different goals to produce a price decision by applying one or more of computation, logic and pricing rules based upon price requests, sales targets, real-time sales data and price watch lists, the architectural implementations of connection between the one or more price integrators and the at least two price optimizers selected from the group consisting of a parallel processing architecture, a pipeline architecture, a hub and spoke architecture, and a hybrid architecture; and
  a processor for receiving price requests and outputting the price quotation.

2. The automatic price quotation system of claim 1, wherein the price integrators and price optimizers are configured to achieve long and short term sales targets simultaneously while the relative priority of each seller goal is changed based upon current market conditions.

3. The automatic price quotation system of claim 1, wherein each price optimizer is implemented by an architecture selected from the group consisting of market-share directed implementation, specific sales target-directed implementations, a seller utility derivative implementation, a selected model optimizer implementation with exploring features, a mathematical optimization-oriented implementation, and a rule-based implementation.

4. The automatic price quotation system of claim 1, wherein the seller automatic engine comprises the combination of a message processing unit connected with a session management unit controlling a price management unit, wherein the session management unit is provided with a session cache for fast access to session data and a session storage unit for persistent storage of session information, and wherein the price management unit contains the price optimizers and price integrators.

5. The automatic price quotation system of claim 4, wherein the price optimizers compute the optimal price based on input data and configuration data bidding, the parameters being programmed by the seller based on its unique business objectives.

6. The automatic price quotation system of claim 5, wherein in the optimal price computation additional conditions are also considered, including supplier's breaks and promotions and other implementations that provide solutions to the diverse goals in the challenges of the seller.

7. The automatic price quotation system of claim 6, wherein the price integrator further enhances the price optimizer outputs through integrating additional variables and business rules as provided by the seller.

8. The automatic price quotation system of claim 7, wherein the additional variables include one or more of: upper and lower bounds on price; ranges of price and/or gross margins in which certain optimizers are given preference; and group discounts applied to the optimizer outputs.

9. The automatic price quotation system of claim 5, wherein the price optimizers work independently or dependently to determine the optimal price for their respective specific target criteria, determining the best price at that instant of time.

10. The automatic price quotation system of claim 9, wherein each price optimizer is selected from the group consisting of global price optimization, event optimization, supplier break optimization, and promotions optimization.

11. The automatic price quotation system of claim 4, wherein the implementing of the price management unit involved effecting price optimization for one or more of the several goals or business objectives of the seller including global price, events, and supplier's breakpoint.

12. The automatic price quotation system of claim 11, wherein the price optimization is effected also in response to market data, historical data, and seller target information fed to the price management unit.

13. The automatic price quotation system of claim 1, wherein the optimized price decision is calculated by an expected seller utility representation of the seller's business objectives while factoring in features including buyer characteristics and competitor behavior.

14. The automatic price quotation system of claim 13, wherein when the request is received, the expected contribution to said utility from the request is calculated, and the optimal price is determined as the price that maximizes that contribution.

15. The automatic price quotation system of claim 14, wherein a utility function is selected from the group consisting of linear function, an exponential function, a piecewise linear function, a piecewise exponential function, and a hybrid function.

16. The automatic price quotation system of claim 14, wherein a utility derivative-following price quotation implementation function is used, and the price is adjusted by the amount of utility earned in a previous period as a result of a price change.

* * * * *